United States Patent
Srinivasan et al.

(10) Patent No.: US 7,451,403 B1
(45) Date of Patent: Nov. 11, 2008

(54) SYSTEM AND METHOD FOR DEVELOPING USER INTERFACES PURELY BY MODELING AS META DATA IN SOFTWARE APPLICATION

(75) Inventors: Venkatesan Srinivasan, Weston, MA (US); Mahantesh Kothiwale, Mansfield, MA (US); Rummana Alam, Walpole, MA (US); Srinivasan Bharadwaj, Sharon, MA (US)

(73) Assignee: Rage Frameworks, Inc., Westwood, MA (US)

( * ) Notice: Subject to any disclaimer, the term of this patent is extended or adjusted under 35 U.S.C. 154(b) by 673 days.

(21) Appl. No.: 10/742,342

(22) Filed: Dec. 19, 2003

Related U.S. Application Data

(60) Provisional application No. 60/435,559, filed on Dec. 20, 2002.

(51) Int. Cl.
*G06F 3/048* (2006.01)
*G06F 3/00* (2006.01)

(52) U.S. Cl. .................. 715/763; 715/762; 715/765; 717/100; 717/104; 717/155; 717/170

(58) Field of Classification Search .......... 715/763, 715/765; 717/100, 104, 155, 170
See application file for complete search history.

(56) References Cited

U.S. PATENT DOCUMENTS

| 5,390,330 | A | * | 2/1995 | Talati ..................... 717/104 |
| 5,544,067 | A | * | 8/1996 | Rostoker et al. ............. 703/14 |
| 5,555,201 | A | * | 9/1996 | Dangelo et al. ............. 716/1 |
| 5,734,837 | A | * | 3/1998 | Flores et al. ................ 705/7 |
| 5,774,661 | A | * | 6/1998 | Chatterjee et al. ......... 709/203 |
| 5,784,275 | A | * | 7/1998 | Sojoodi et al. ............. 700/86 |
| 5,812,850 | A | * | 9/1998 | Wimble ................... 717/131 |
| 5,915,115 | A | * | 6/1999 | Talati ..................... 717/155 |
| 6,025,836 | A |   | 2/2000 | McBride |
| 6,067,641 | A | * | 5/2000 | McInerney et al. .......... 714/38 |
| 6,141,724 | A | * | 10/2000 | Butler et al. ............... 717/107 |
| 6,170,081 | B1 | * | 1/2001 | Fontana et al. ............ 717/104 |
| 6,205,575 | B1 | * | 3/2001 | Sherman et al. ........... 717/100 |
| 6,230,309 | B1 | * | 5/2001 | Turner et al. .............. 717/107 |
| 6,233,537 | B1 | * | 5/2001 | Gryphon et al. ............. 703/1 |
| 6,243,861 | B1 | * | 6/2001 | Nitta et al. ................ 717/108 |
| 6,342,907 | B1 |   | 1/2002 | Petty et al. |
| 6,427,230 | B1 | * | 7/2002 | Goiffon et al. ............ 717/108 |
| 6,550,054 | B1 | * | 4/2003 | Stefaniak .................. 717/14 |
| 6,601,233 | B1 | * | 7/2003 | Underwood ............. 717/102 |
| 6,874,008 | B1 | * | 3/2005 | Eason et al. .............. 709/201 |

(Continued)

FOREIGN PATENT DOCUMENTS

WO    WO 0072184 A2    11/2000

*Primary Examiner*—Steven B Theriault
(74) *Attorney, Agent, or Firm*—William L. Botjer

(57) ABSTRACT

A system, method and computer program that enables an application designer to automate the process of development of user interfaces (UIs). The designer develops UIs by modeling. The process of development of UI applications by modeling does not require any coding. The modeling activity is accomplished by using the visual modeling environment, which among other tools comprises a set of pre-built reusable components. Each component represents a dimension of functionality that is commonly required in UI applications. The designer specifies application-specific context for the components. Components when provided with application specific context become tasks. The tasks are then connected together in a logical order to develop an application. The applications thus developed are then visually verified. These applications are then executed by an Engine.

8 Claims, 26 Drawing Sheets

U.S. PATENT DOCUMENTS

| | | | |
|---|---|---|---|
| 6,874,146 B1* | 3/2005 | Iyengar | 719/313 |
| 6,957,417 B2* | 10/2005 | Turner et al. | 717/108 |
| 6,975,970 B2* | 12/2005 | Thorisson | 703/1 |
| 6,993,759 B2* | 1/2006 | Aptus et al. | 717/170 |
| 7,089,530 B1* | 8/2006 | Dardinski et al. | 717/105 |
| 7,181,493 B2* | 2/2007 | English et al. | 709/204 |
| 7,185,317 B2* | 2/2007 | Fish et al. | 717/121 |
| 7,213,230 B2* | 5/2007 | Harel et al. | 717/113 |
| 7,370,315 B1* | 5/2008 | Lovell et al. | 717/100 |
| 2001/0047251 A1* | 11/2001 | Kemp | 703/1 |
| 2002/0040312 A1* | 4/2002 | Dhar et al. | 705/8 |
| 2002/0049625 A1* | 4/2002 | Kilambi et al. | 705/9 |
| 2002/0059054 A1* | 5/2002 | Bade et al. | 703/20 |
| 2002/0147763 A1* | 10/2002 | Lee et al. | 709/202 |
| 2002/0165995 A1* | 11/2002 | Matula et al. | 709/316 |
| 2002/0184610 A1* | 12/2002 | Chong et al. | 717/109 |
| 2003/0084016 A1* | 5/2003 | Norgaard et al. | 706/60 |
| 2003/0153998 A1* | 8/2003 | Clifford | 700/121 |
| 2003/0154191 A1* | 8/2003 | Fish et al. | 707/2 |
| 2004/0044987 A1* | 3/2004 | Kompalli et al. | 717/100 |
| 2004/0046787 A1* | 3/2004 | Henry et al. | 345/744 |
| 2004/0088678 A1* | 5/2004 | Litoiu et al. | 717/104 |
| 2004/0103014 A1* | 5/2004 | Teegan et al. | 705/8 |
| 2004/0117759 A1* | 6/2004 | Rippert et al. | 717/100 |
| 2004/0122853 A1* | 6/2004 | Moore | 707/103 R |
| 2004/0133873 A1* | 7/2004 | Dan et al. | 717/100 |
| 2004/0148586 A1* | 7/2004 | Gilboa | 717/108 |
| 2004/0148588 A1* | 7/2004 | Sadiq | 717/109 |
| 2004/0216030 A1* | 10/2004 | Hellman et al. | 715/500 |
| 2006/0064666 A1* | 3/2006 | Amaru et al. | 717/100 |
| 2006/0074735 A1* | 4/2006 | Shukla et al. | 705/8 |
| 2007/0033567 A1* | 2/2007 | Carlson et al. | 717/100 |

* cited by examiner

SYSTEM AND METHOD FOR DEVELOPING USER INTERFACES PURELY BY MODELING AS META DATA IN SOFTWARE APPLICATION

RELATED APPLICATIONS

This application claims priority to U.S. Provisional Patent Application No. 60/435,559 entitled "A System And Method For Developing User Interfaces Purely By Modeling As Meta-Data In Software Application" by Dr. Venkatesan Srinivasan, Mahantesh Kothiwale, Rummana Alam and Srinivasan Bharadwaj, filed on Dec. 20, 2002, which is incorporated by reference as if set forth herein in its entirety.

BACKGROUND

The present invention relates to the field of development of graphical user interfaces (GUIs). More specifically, the present invention relates to the field of rapid development of GUIs.

The Evolution of GUIs

As semiconductor-processing power increases and computer architecture improves, the overall performance of computer hardware has improved exponentially. More sophisticated computer software evolved to take advantage of the higher performance of the hardware and to offer richer functionality. The task of developing an appropriate interface between the application and the user became more and more difficult, as software applications became more complex.

Before the advent of the user interface (UI), commands to a software application were provided by text menus. The output of the processing done by the application was also displayed in text format. As software applications became more complex, the number of inputs from the user and the display needs increased significantly. Taking input and displaying output in text formats was found to be an inadequate way of handling the interaction between the application and the user. Hence, GUIs were developed to provide a more user-friendly paradigm.

Early GUIs were developed for computer operating systems with Apple and Microsoft taking the lead. Application developers of big enterprise-wide applications followed the lead and started developing GUIs for their applications. Today, almost all applications come with a GUI in conjunction with a mouse, a keyboard or a touch screen to select various options. For example, all the enterprise resource planning applications like SAP™, present data differently to different users depending on their requirements. Similarly, various desktop applications use GUIs extensively for providing a user-friendly interface to allow the user input data and to present output. For example, various applications for media manipulation and technical analysis like AnSyS™, AutoCAD™, MATLAB™, etc. use GUIs extensively for user input and for displaying output. Therefore, development of the GUI has become integral to the development of any software application.

Historically, application logic was coded on the server in the mainframe computer. In this architecture, no GUIs were developed as the entire application logic was coded on the mainframes. Later on client server architecture was introduced. With the introduction of client-server architecture, application logic was coded and deployed on the client side as well. Thus, GUIs were developed accordingly and installed on the client side. In present day network architecture, GUI applications are coded to deal with the presentation layer only. As a result, the presentation layer is distinct from the data access layer and logic layer.

GUI Development Process and Challenges

GUI development is an integral part of any software development effort that requires user interaction. Despite significant advances in software development methodologies, architecture and tools, the pace and ease of GUI development and modifications is inadequate.

In a contemporary layered architecture, GUI development is largely limited to coding the presentation of information to the users, validating and capturing user actions and interfacing with the application's logic and data access layers. In older architectural paradigms, GUI development may also involve the development of application logic and/or data access functionality.

The conventional way to develop GUIs is to go through a software development lifecycle (SDLC). As shown in FIG. 1, an SDLC consists of various stages as an idea gets converted into a software application. At each stage, output from the previous stage is translated to serve the purpose of the current stage. In such a cycle, unless one stage of the cycle is complete, next stage cannot be started. Also, with each translation, an effort is made to preserve full information and knowledge from the previous stage. Thus, a significant amount of overhead is created at each stage. As a result, traditional SDLC results in a time-consuming development of complex and cumbersome software applications for GUIs.

Methodological Improvements and their Impact on GUI Development

One of the major hurdles in GUI development is the amount of time it takes from conceptualization to completion. While Prototyping tools have eased the issue somewhat, the time to market is prohibitively long. There is a need to dramatically reduce the time to market in GUI development.

Another hurdle in GUI development has been the lack of inter-operability across operating platforms. Obviously, this increased the time and effort to develop GUIs for cross-platform applications. The advent of the Java™ programming language has alleviated the challenge considerably. Java™, originally developed by Sun Microsystems, is an object-oriented, multi-threaded, portable, platform-independent, secure programming environment used to develop, test and maintain software programs. A Java™ virtual machine is used to run a single Java™ source code on all the platforms, thereby substantially decreasing the efforts required in GUI generation.

While Java has enabled inter-operability, the emergence of network centric computing and the Internet have made browser based GUIs the presentation medium of choice. Designers face two broad challenges in this context. First, they have to choose amongst multiple programming options on which to develop the GUIs, e.g. Java Server Pages, Active Server Pages, etc. Second, there are considerable challenges if a designer wants to develop the same GUI on a browser and on the desktop. In most cases, the designer has to develop the GUIs twice, once for the browser and once for the desktop.

Another hurdle in GUI development is the rapid evolution of GUI development environments and frameworks and the need for people skilled in these environments. Today, a diverse range of options exists with different capabilities suited for different applications. Hence, there is a requirement for a GUI development tool that allows GUI generation without the knowledge of any programming languages.

To accelerate the process, various GUI development tools are available today. A GUI development tool is a software product used to facilitate rapid development of GUIs by automating some of the repetitive tasks. Currently available visual development tools automate the process of GUI development to a large extent. Developers can drag/drop various GUI components into the main window and the corresponding code snippets are automatically added to the main code. Hence, a substantial decrease in development time is achieved. However, there are various hurdles in the rapid development of GUIs.

All GUI development tools today are code generators and some of them provide visual development tools like Microsoft Visual Studio, Visual Café, Jbuilder, etc. These tools generate code in the specified language, which is then compiled and deployed. Since the output of all these tools are in the form of code in a programming language, they require expert knowledge of the programming environment. These tools are complete application development environments and do not allow the generation of GUIs independent of the application. Development tools based on Extensible Markup Language [XML] and Extensible Style Sheets [XSLT] do allow the generation of GUIs but require specialized programming skills.

Related Patents and Products

Various systems have been proposed to overcome one or more of the above shortcomings. A WIPO Patent application No. 0072184, Entitled "A Platform Independent System Of Specifying An Embedded User Interface" of Matsushita Mobile Communication Development Corp. of USA, discloses a development tool for developing embedded user interfaces. The patent discloses a system of storing and generating a user interface in the form of elements and parameters. These elements and parameters describe various aspects of the user interface including the form of presentation to the user and response to the user feedback. A User Interface Engine residing within a target device (like mobile phones and various electronic gadgets) monitors user events and displays the user interface in accordance with the elements and parameters.

Another system as disclosed in U.S. Pat. No. 6,025,836, entitled "Method And Apparatus For Generating Object Oriented User Interfaces" assigned to Novell, Inc., develops object oriented user interfaces. The User Interface Generator creates separate class files containing user interfaces suitable for use in different languages. The invention aims to achieve reusability and rapid generation of complex user interfaces to minimize costs associated with internationalization of software applications.

Yet another U.S. Pat. No. 6,342,907, entitled "Specification Language For Defining User Interface Panels That Are Platform-independent" assigned to International Business Machines (IBM), specifies a specification language to allow a developer to define platform-independent user interface panels without a detailed knowledge of complex computer programming languages. A Panel Definition Markup Language (PDML) is defined in accordance with the Extensible Markup language (XML) standards. Java Swing is used to generate user interfaces. A graphical editor allows the creation and modification of platform-independent user interface panels without programming directly in the specification language. A run-time manager for different platforms process PDML panels to display the panels.

All the abovementioned patents and products require the GUI developer to do some coding for generating GUIs. Moreover, some of them primarily focus on GUIs for embedded systems. No generalized solution is available that does not require any coding for GUI generation. Also, these patents and products focus on one or more of narrow problems, like controlling the exact location of user interface objects using Java™ swing. None of the patents and products addresses the abovementioned drawbacks of the GUI development process at a broader level. Hence, there is a need for a system that addresses all the abovementioned issues.

SUMMARY

The present invention is directed to a system, method and computer program that provides an application development framework that automates the process of Graphical User Interface (GUI) development rather than automating the process of coding.

An object of the present invention is to provide a system, method and computer program that enables an application designer to develop GUIs for software applications by modeling without coding.

Another object of the present invention is to provide a system, method and computer program that enables an application designer to develop GUIs for software applications based on computational logic with reduced software development life cycles.

A further object of the present invention is to provide a system, method and computer program that reduces GUI development activity to a pure modeling exercise.

Another object of the present invention is to provide a system, method and computer program that allows changes to be made rapidly in GUIs by merely changing the GUI models without doing any coding or code-testing as in a conventional software development life cycle.

Another object of the present invention is to provide a system, a method and a computer program that is user friendly and reduces and/or eliminates the need for an application designer to have expertise in at least one formal programming language.

To attain the above-mentioned objectives, the present invention provides a system, method and computer program that provides a complete application development environment for GUIs. The application development environment comprises a visual modeling environment that enables an application designer to design and model GUIs, a set of reusable pre-built components, an Engine capable of executing the GUIs and a database to store GUIs modeled by the application designer. The visual modeling environment allows the application designer to develop GUI models in a flowchart like manner using the pre-built reusable components. These reusable components are highly abstract objects that are built to perform a specific function in computation. The designer creates computational logic based applications by selecting appropriate components, specifying application specific meta-data to model tasks using selected components and then logically connecting them with each other. The components are reusable, i.e. once a component is selected, a copy of that component is created for use in an application. Thus, a component can be used in different applications by creating copies of the component and specifying meta-data as per the application's properties. After selecting the required components, the designer inputs application-specific data. The application specific data provided to a component is called meta-data.

For example, consider a Rule component that represents the functionality of computation of a condition. The application designer inputs the condition to be computed for the GUI in the form of meta-data. Also, the application designer specifies the tasks to be executed in the case of success and failure of the rule. A component instance when provided with application specific data becomes a task. The tasks thus generated are then connected together in a logical manner to create GUI applications. After modeling, these applications are verified. The application designer may verify the entire application at once, in parts or task by task. To verify the modeled application in parts, the application designer sets breakpoints in the application.

The GUI applications modeled and verified using the visual modeling environment are executed using the Engine. The application models generated can also be executed by third party systems. That is, the system according to the present invention has the capability of integrating with third party systems.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

1. Introduction

The present invention provides for a method, system and computer program to automate the process of developing Graphical User Interfaces (UIs). Hereinafter, Graphical User Interfaces (GUIs) will be referred to as User Interfaces (UIs). As opposed to the current set of application development technologies that focus on automating the process of coding user interfaces, the current invention provides a method, system and computer program to reduce the user interface development activity to a modeling exercise and relies on abstract components to eliminate coding altogether.

Figure 1:
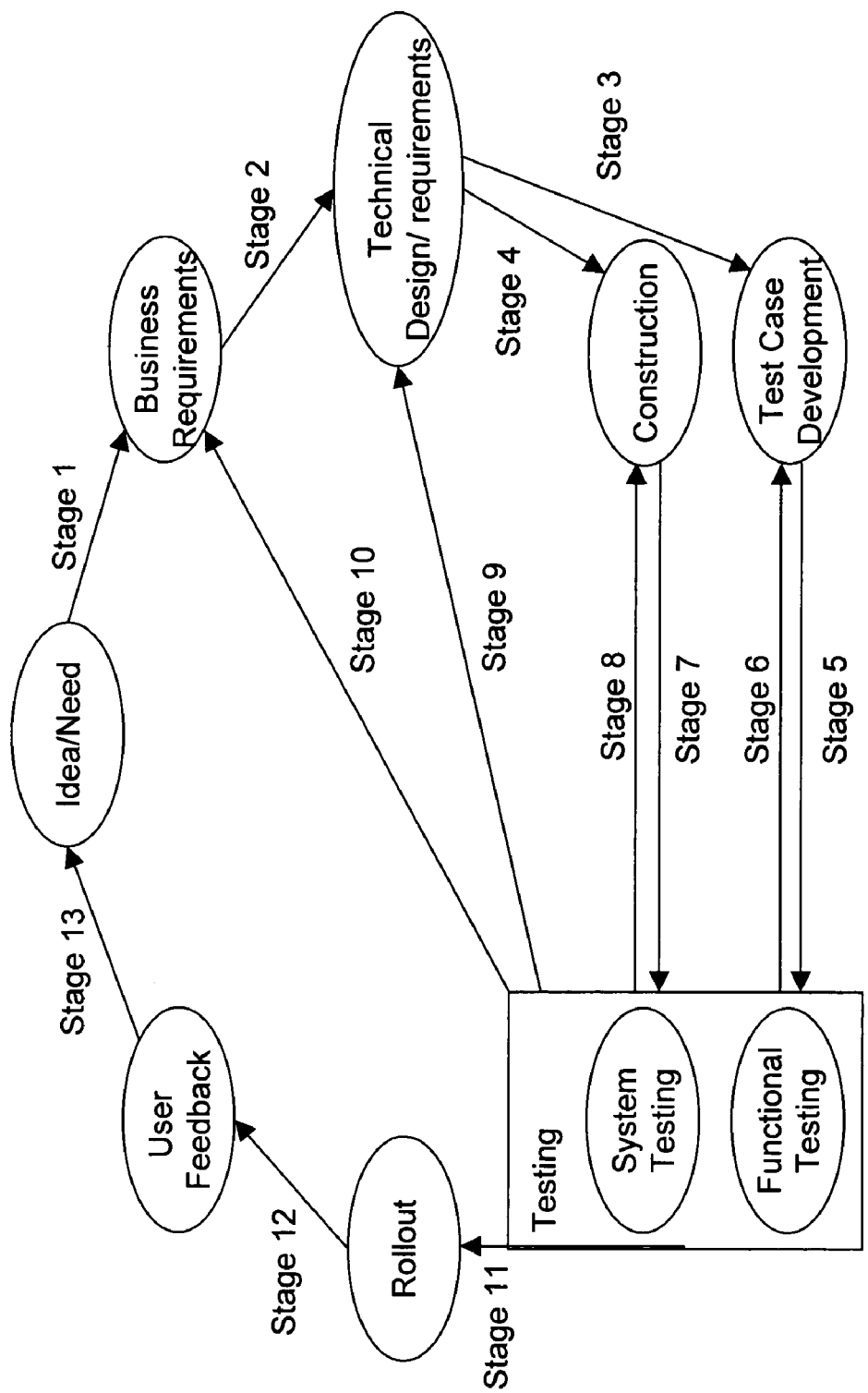
FIG. 1 illustrates a conventional Software Development Lifecycle (SDLC)
Figure 2:
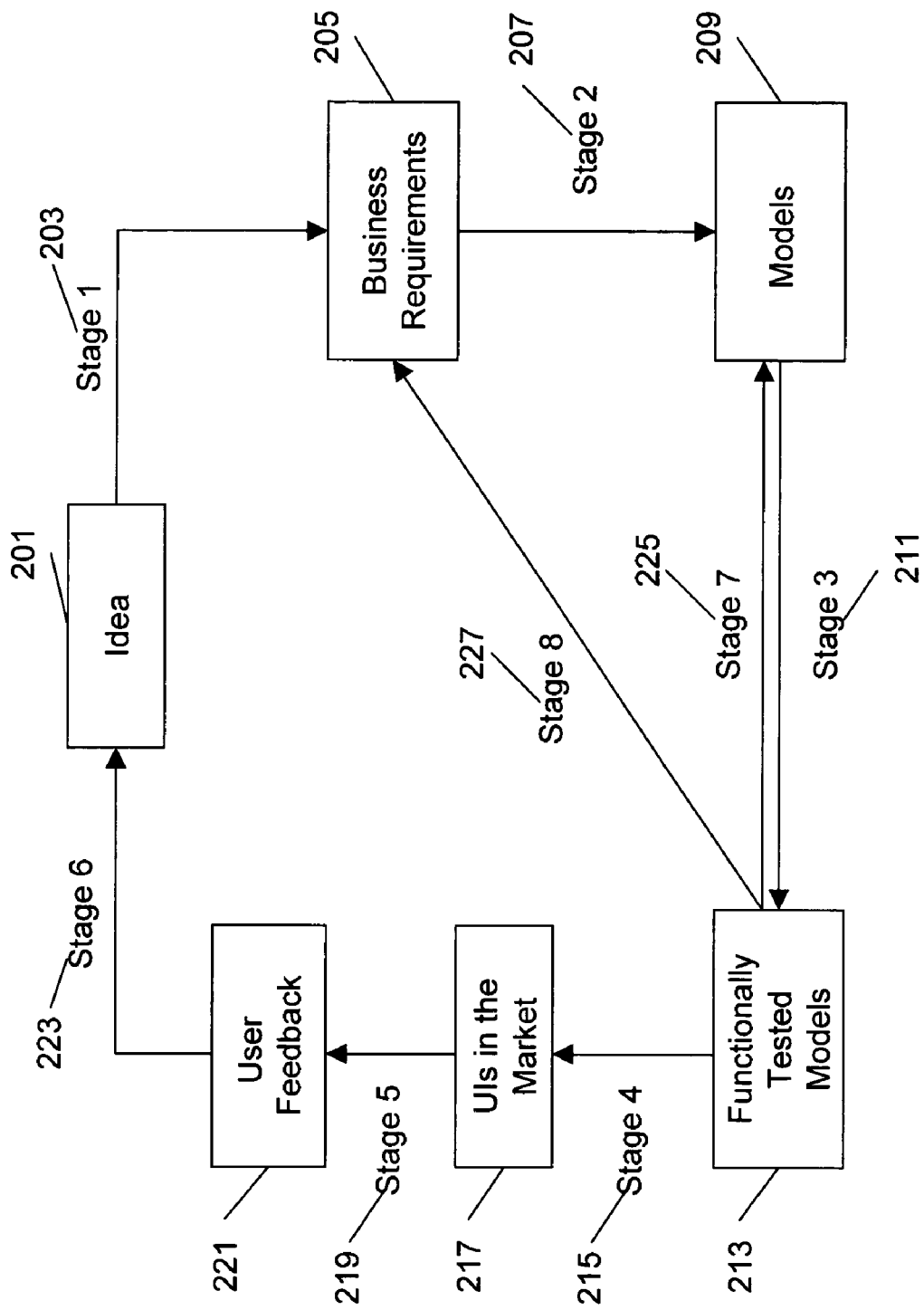
FIG. 2 illustrates a software development lifecycle in accordance with an embodiment of the present invention.

Referring primarily to FIG. 2, a software development lifecycle in accordance with an embodiment of the present invention is hereinafter described. In this lifecycle, the development starts with the conception of an idea 201 for an application. A First stage 203 involves the translation of idea 201 into Business requirements 205. Business requirements 205 are documented in terms of the business processes that need to be supported by the application. These business processes include the user interface needs of the application. A Second stage 207 involves visual modeling of Business requirements 205 in accordance with an embodiment of the present invention. The output of the second stage is Models 209 of Business requirements 205. In a Third stage 211, Models 209 are tested for their functional validity. The output of Third stage 211 is Functionally tested models 213. Functionally tested models 213 are ready to be released as UIs. At a Fourth stage 215, Functionally tested models 213 (User Interfaces) are rolled out as finished UIs 217. A Fifth stage 219 involves obtaining user feedback 221 on finished UIs 217 from the users. A Sixth stage 223 reflects that the feedback from the users typically results in generation of a new idea; after this stage, the software development lifecycle starts all over again. Seventh stage 225 and Eighth stage 227 are feedback stages where functional testing of Models 209 may result in revisions of Business requirements 205 and/or Models 209.

Figure 3:
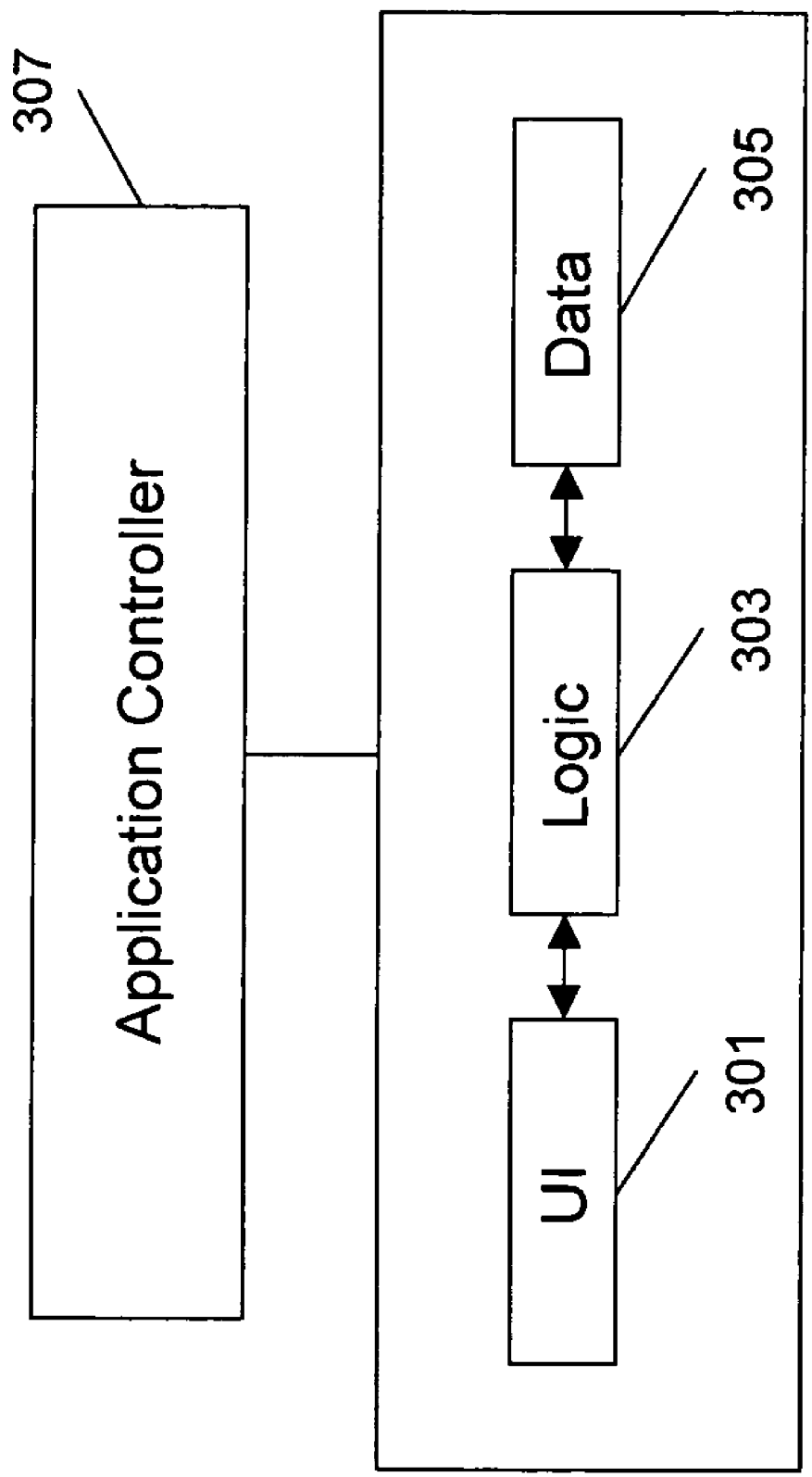
FIG. 3 illustrates the layer structure of a software application in accordance with an embodiment of the present invention.

The present invention is applicable whenever software development requires user interface development. The degree of separation between user interfaces, application logic and the application data is a function of the architectural approach adopted by the application development team. As shown in FIG. 3, a software application generally comprises three layers: User Interface 301, Application logic 303 and Application data 305. In addition to the three layers, we can view an Application Controller 307 as the coordinating mechanism that facilitates the required flow through the application. These are logical separations and the exact line of demarcation between the layers depends on the context and needs of the application. The generally recommended approach is to keep the user interface or presentation layer as thin as possible.

In accordance with an embodiment of the of the present invention, user interface development includes the development of screens, the interaction between the user interface and Application Controller 307 including the navigation between screens and validation of user input. This is without loss of generality. Application Controller 307 defines and controls the overall flow of the UI application logic. The present invention allows for narrower or broader definitions of the scope of user interface development. Further, the modeling semantics may vary slightly as a function of the target deployment environment (Java, Windows, Macintosh, etc.) and the type of user interface (browser-based, desktop-based).

Figure 4:
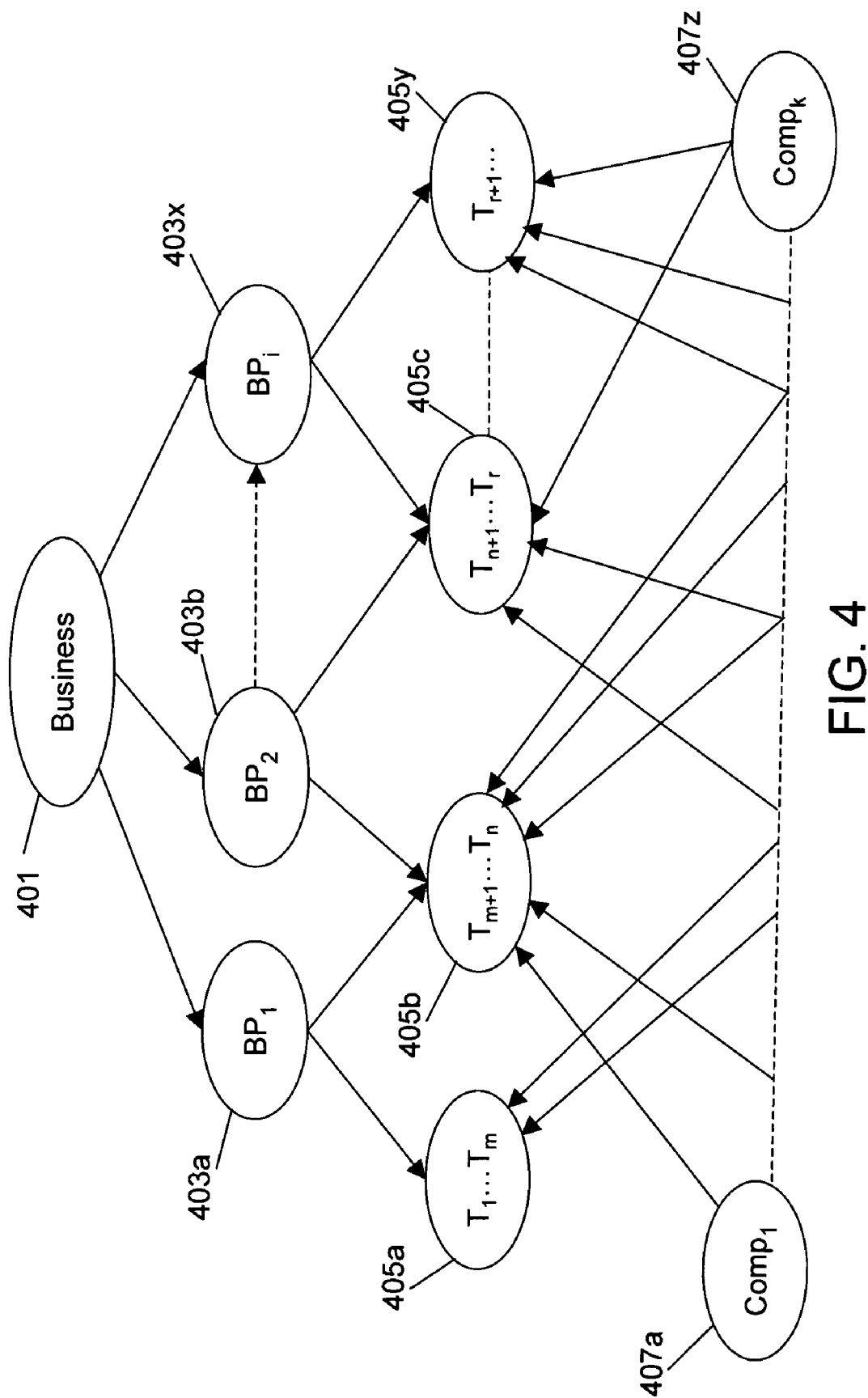
FIG. 4 illustrates a multi-echelon systematic view of a business in accordance with an embodiment of the present invention.

In accordance with an embodiment of the present invention, application requirements are modeled as described in U.S. patent application Ser. No. 10/336,965, entitled 'Business Process Technology For The Enterprise', by Rage Frameworks, Inc filed on Jan. 6, 2003, which is incorporated by reference as if set forth herein in its entirety. Here a business or a business problem is broken down into its constituent business processes. Referring now primarily to FIG. 4, such a multi-echelon systematic view of a business is hereinafter described in detail. A Business 401 comprises Business processes 403a-x. As shown, business process 403b may initiate another Business process 403x; business process 403x may be viewed as a sub-process of Business process 403b. Each Business process 403a-x is a collection of business tasks. For example, Business process 403a comprises a Set of tasks 405a and another Set of tasks 405b wherein Set of tasks 405a further comprises Tasks $T_1$ to $T_m$ and Set of tasks 405b further comprises Tasks $T_{m+1}$ to $T_n$. These tasks are arranged in a logical order to model the business process. The tasks, when carried out in the defined logical order, would execute the business process. Multiple arrows (coming from the top in the figure) into a Set of tasks, for example Set of tasks 405b, illustrate that the same set of tasks is being executed in more than one Business process (403a and 403b). Finally, each task, (for example T1), is an instance of one of abstract Components 407a-z. Components 407a-z are highly abstract objects that are built to perform a specific function in user interfaces. Instances of Components 407a-z, when provided with business process specific properties called "meta-data" become business tasks. Different instances of the same component will result in different business tasks appropriate for the process they are being used in, even though they are instances of the same abstract business component. For example, two tasks that display User Interface screens are both instances of the user interface component and yet, each would display two different screens and would be used in two separate processes or the same process. The difference between the two tasks lies in the task-specific properties specified as meta-data to the instance of the components used in the respective tasks.

Once business requirements are identified in terms of the underlying business processes, they are modeled using an embodiment of the present invention, including their inter-relationships across processes. The modeling activity is accomplished by using the visual modeling environment in accordance with an embodiment of the present invention. The visual modeling environment comprises a set of abstract business components among other tools. Each business process is viewed as a collection of business tasks. Each business task is modeled as an instance of an abstract business component. The instance acquires process-specific context with process-specific parameters (meta-data) input by the application designer. Such tasks are then connected together as required for the business process. The entire set of business process models for an application, including their inter-relationships, is referred to as the application domain.

There are many different scenarios that an application designer could adopt when approaching application modeling. A few sample scenarios are described:

Scenario A
Start with the application domain first and identify as many high level processes as possible
Model the processes and their tasks including providing process-specific information (meta-data) for each task and data requirements
Design an appropriate data model
Revise processes, as appropriate
Scenario B
Start with data requirements first and design the data model
Model the application's User Interface
Model non-User Interface processes
Review and modify, as appropriate
Scenario C
Start with a User Interface storyboard
Complete User Interface models
Model any non-User Interface processes
Complete the data model
Review and modify, as appropriate Scenario A is a top-down approach to modeling an application. In this approach, the application designer starts by modeling the application's domain and then proceeds to model the details. A data model is a structural representation of the data that would be collected in any application and stored permanently. On the other hand, Scenarios B and C, start with a specific aspect of the application (for example, the application's User Interface storyboard in scenario C) and proceed to other aspects later. A User Interface storyboard is a map of all the user interface screens and their relationship with each other.

The actual approach followed is a function of the application designer's prior experience and expertise. While the above scenarios have been described as being sequential, the process is likely to be iterative between the various steps. Further, the abovementioned scenarios are not mutually exclusive; an application designer may follow a combination of the abovementioned scenarios. The present invention should not be considered limited to these scenarios and their combinations only; it is also possible to conceive of many more scenarios.

In accordance with an embodiment of the present invention, user interface development substantially translates to the development of a process that encapsulates all the sub-tasks required for the user interface identified earlier in this section. The modeling environment of the present invention provides a business friendly point-and-click facility for the application designer to model all these sub-tasks by providing a set of abstract components that represent commonly required functionality in user interface development.

Once the models are developed, the next stage involves testing the logical accuracy and efficiency of the models. Upon having validated the models for logical accuracy and efficient performance, user interfaces are ready to be released.

In the software development lifecycle in accordance with an embodiment of the present invention, as described in FIG. 2, the number of stages in the cycle are significantly less with the less value added steps largely eliminated. Stages that do not add any significant value to the final application are largely eliminated. Stages that arise purely because of coding are also eliminated. The reduction in the number of stages also results in a reduction in the number of feedback stages, for example, Seventh stage 225, resulting in a significantly simplified cycle.

2. Example User Interfaces

In this section, we illustrate the working of the UI component with several examples. User Interfaces can be broadly categorized into two types: browser-based and desktop-based. Browser-based applications have gained in popularity for the ease with which they can be deployed and maintained while desktop-based applications continue to be the choice in the case of applications that involve significant amounts of analytics and complex user-interaction.

While there is significant commonality in the process of different combinations of target environments (Windows, Macintosh, etc.), the application types may require different sets of meta-data.

2.1 Browser-based User Interface

Figure 5:
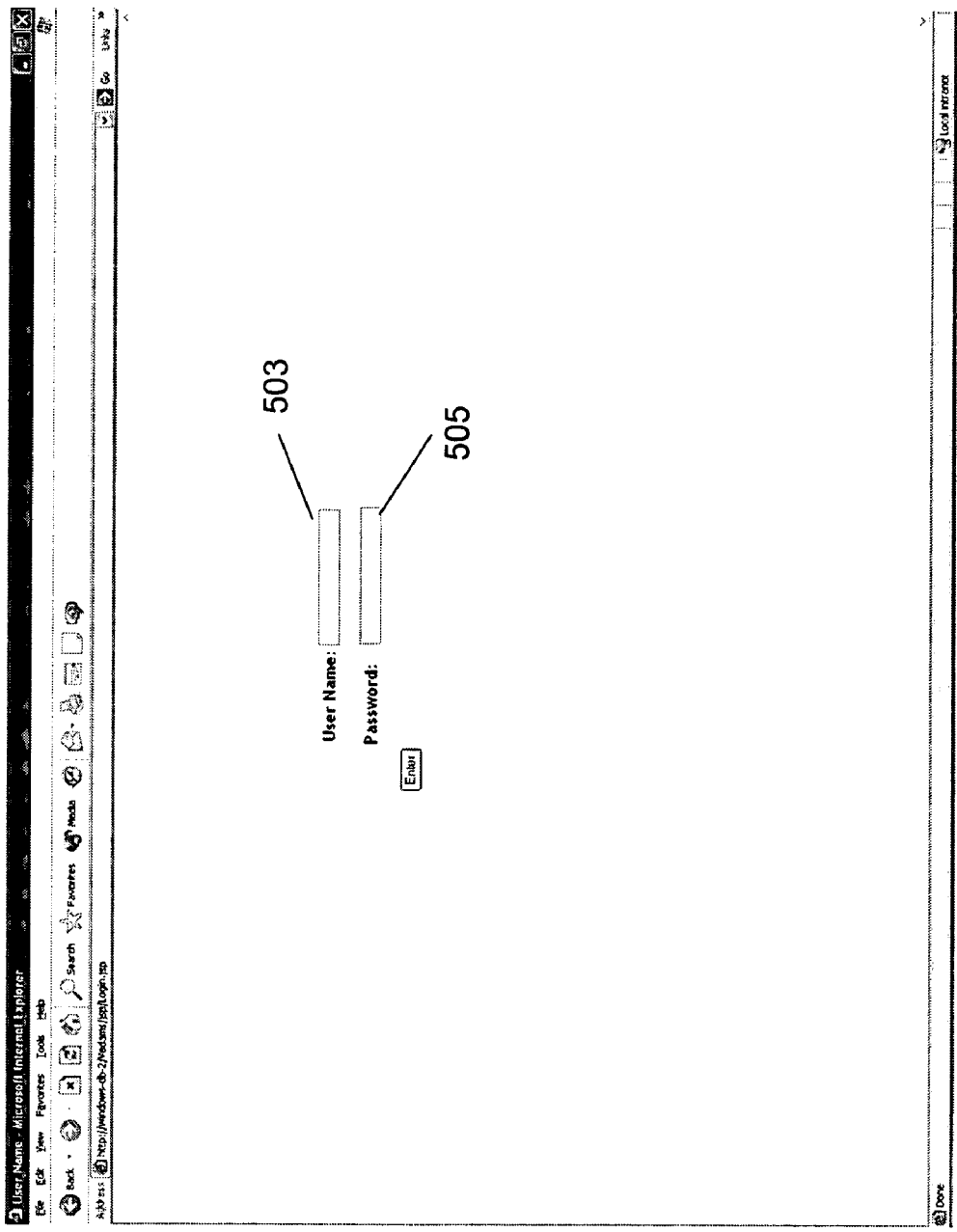
FIG. 5 is a screenshot of a browser based User Interface.

FIG. 5 illustrates a screenshot of a browser based UI 501 generated in accordance with the present invention. Screenshot of UI 501 corresponds to an application that validates a user using a user name and a password. In UI 501, a field 503 is provided to a user to enter a user name and a field 505 is provided to enter a password. The meta-data files can be stored in a relational database in many different formats including but not limited to text and XML.

The meta-data for UI 501 consists of attributes for the screen, 2 text fields ('username' and 'password') with their look and feel attributes (length, font, font-style, label, etc), 2 buttons with their attributes (name, length, etc.) and 2 actions corresponding to the 2 buttons. The meta-data consists of 6 columns. These six columns together allow the application designer (UI modeler) to specify all the attributes for UI 501. The first column is the name of an object to be placed on UI 501. The second column specifies the section that the object is a part of, e.g. header, body, etc. The third column refers to the type of object. The type of the object includes but is not limited to—Form, Variable, Link, Table, etc.

The type of objects specified in the meta-data represent the objects used in UI 501 and the present invention should not be considered as limited to these types of objects only. Numerous similar types of objects will be apparent to those skilled in the art. The fourth column refers to a sub object where one is required in some cases, e.g. a sub object of UI objects 'username' and 'password' is 'input'. The fifth column is an attribute column, which specifies various attributes for the objects. For example, for the UI object 'username' the attributes listed in the meta-data are—'name', 'maxlength', 'size' and 'value'. The sixth column defines the values of the attributes of an object listed in the fifth column. For example, for the UI object 'username', the values of the attributes 'name', 'maxlength', 'size' and 'value' are 'username', '20', '20' and ' . . . ' respectively.

Desktop-Based User Interface

Figure 6:
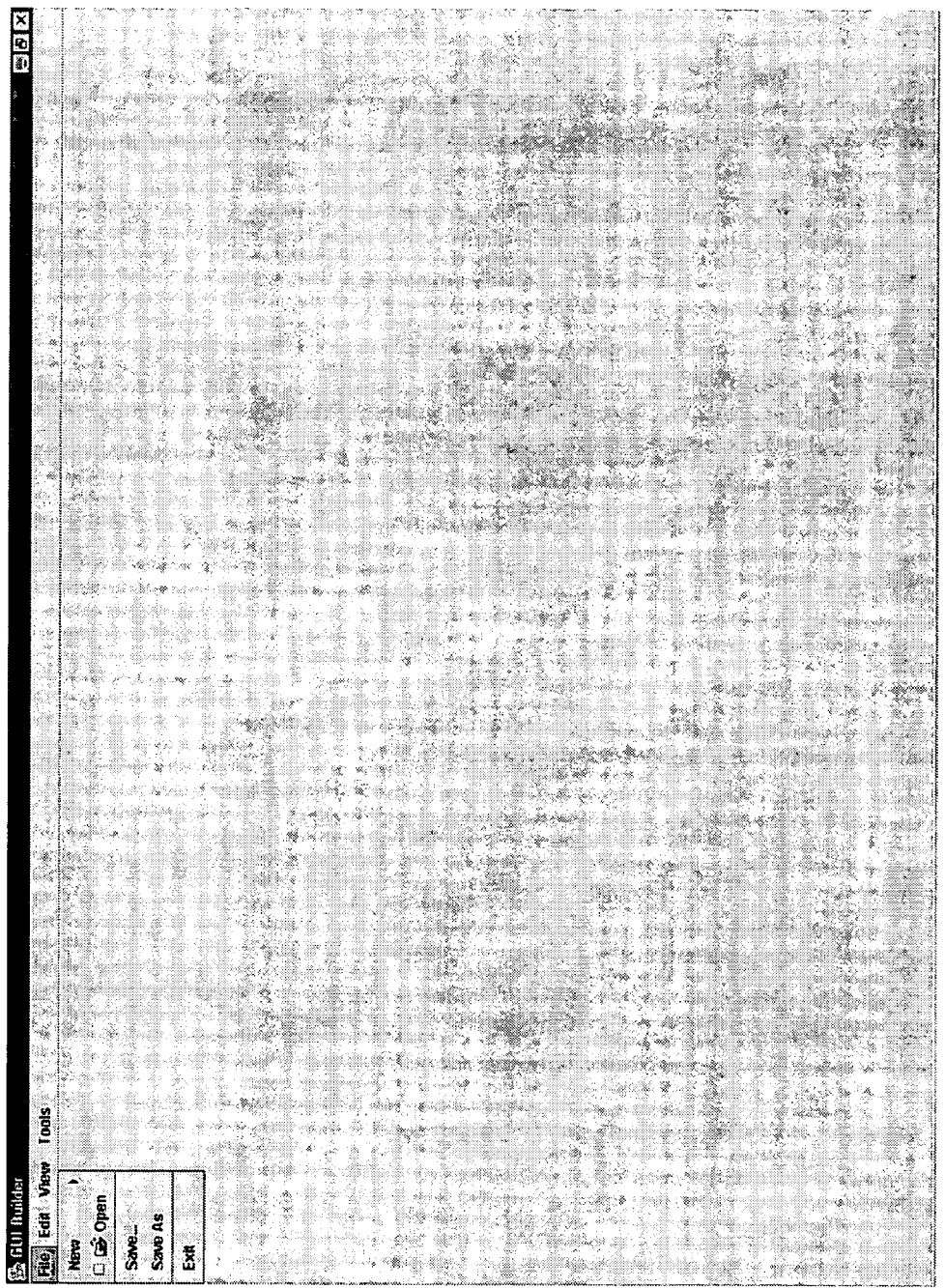
FIG. 6 is a screenshot of a desktop-based User interface.
Figure 7:
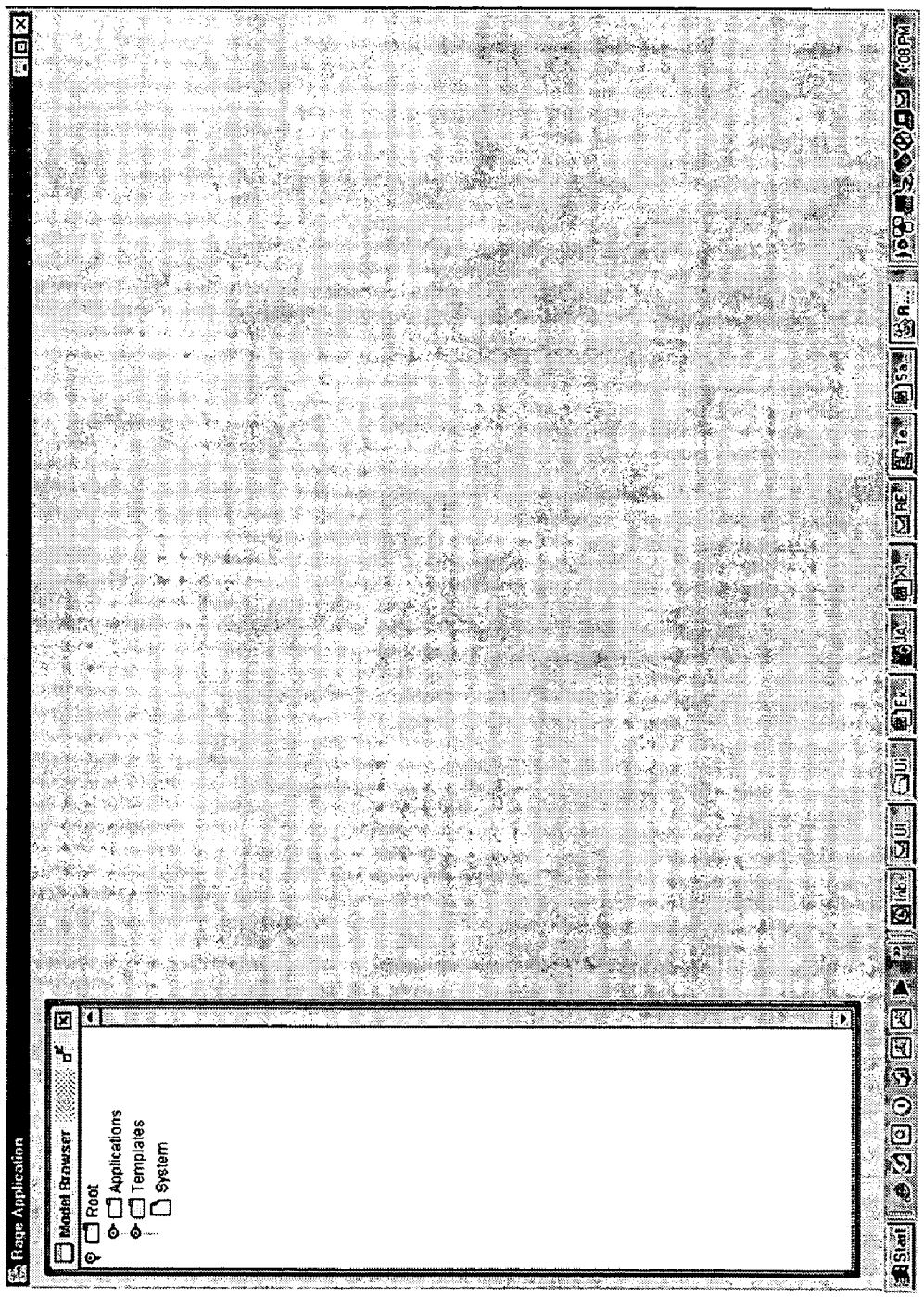
FIG. 7 is a screenshot of a desktop-based User interface.

Examples of desktop-based UIs generated using the present invention are presented in FIG. 6 and FIG. 7. These figures collectively illustrate the depth of functionality of the UI component by demonstrating the modeling of a GUI for the UI component itself.

FIG. 6 is an example of a menu system for a desktop-based application that has been generated by the UI component. The UI here has been generated for the Java Swing environment.

The meta-data for the menu tree comprises a menu control with specifications for each menu (label, action, keyboard shortcut), menu items for each menu again with all the necessary attributes like label, action, etc.

Figure 8:
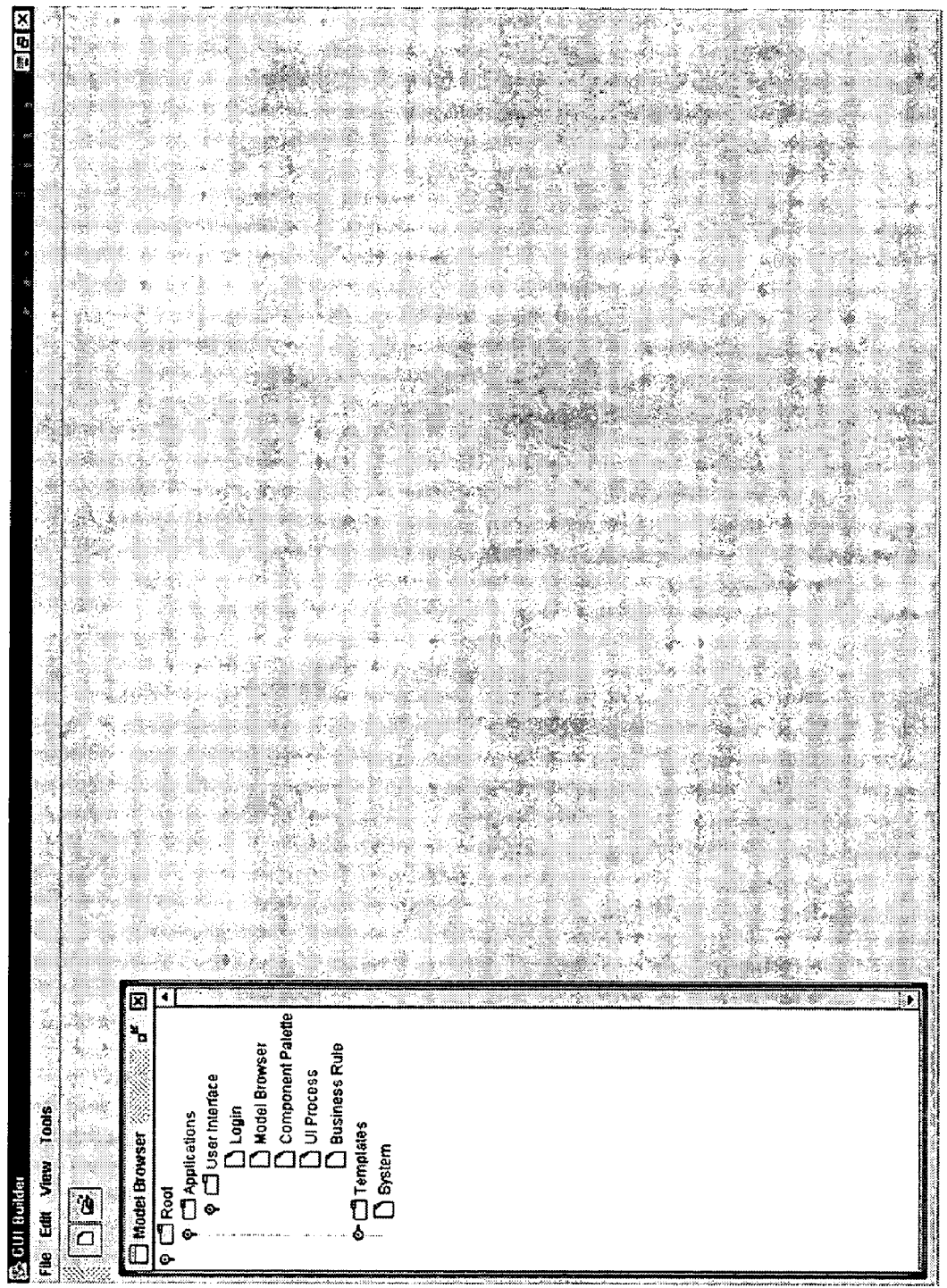
FIG. 8 is a screenshot of a user interface that comprises a menu system and a model browser.

The meta-data structure for the Swing environment has 8 attribute columns and has essentially the same structure as the structure for the Java Server Pages illustrated in the previous section. The first column is an object reference. The second column is a function or object type reference. The third column specifies the name of the attribute and the remaining columns are attribute value columns. FIG. 8 is an example of a model browser, which is useful as a navigation GUI for the UI component.

The purpose of the model browser is to list all the applications and UI models that the designer is working on and allow easy access to the models. FIG. 8 illustrates both the menu system and the model browser together.

Figure 9:
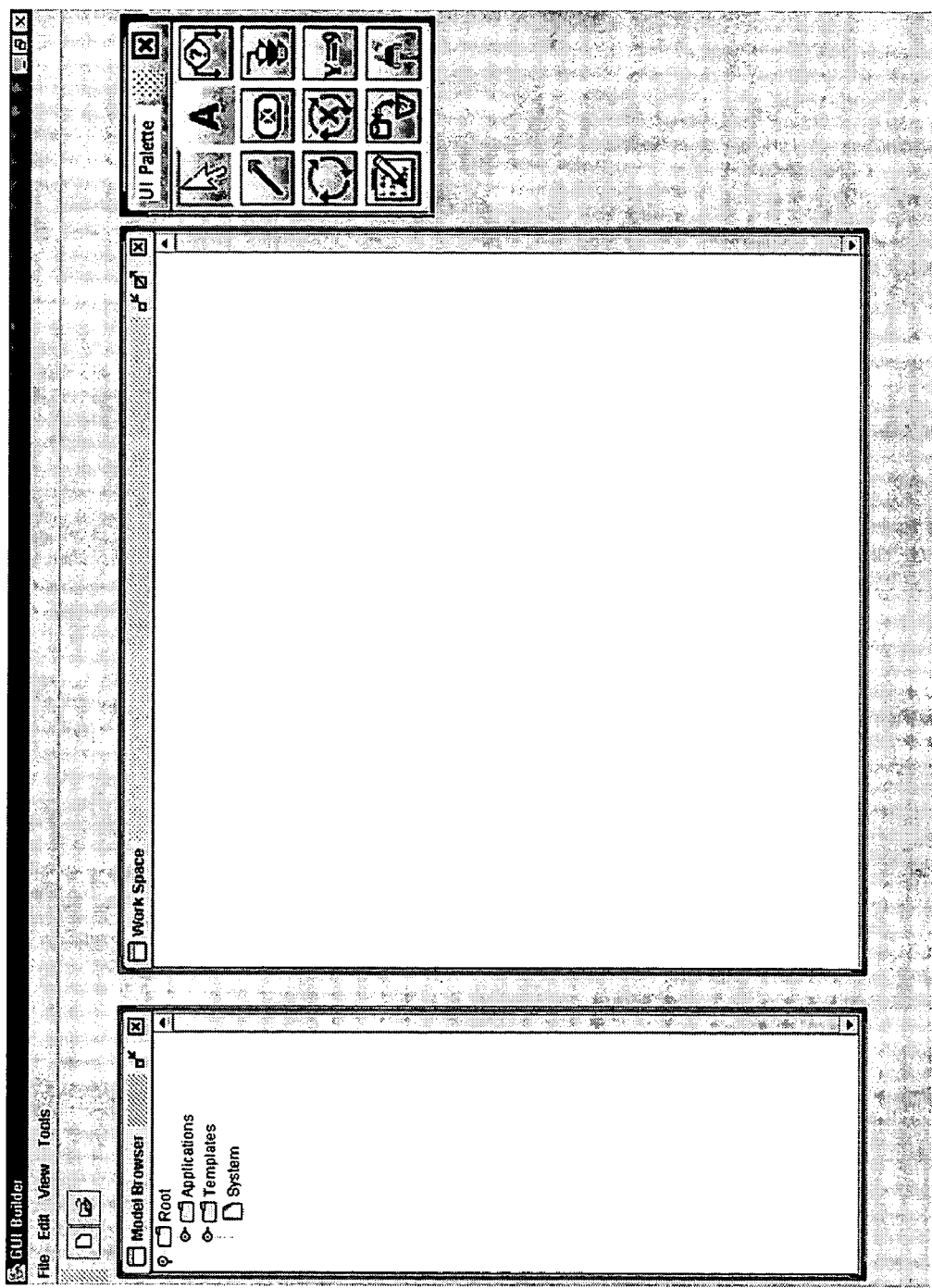
FIG. 9 is a screenshot of a user interface that has a menu system, the model browser, a UI Tool Palette and a process drawing workspace.

FIG. 9 presents an integrated set of desktop-based UIs that can serve as the GUI for developing UI models in accordance with an embodiment of the present invention. FIG. 9 brings together the menu system, the model browser, a UI tool palette and a process drawing workspace. The menu system (FIG. 6), the model browser (FIG. 7), the tool palette and the workspace are all custom UIs, which have been loosely coupled in FIG. 9. The meta-data for the UI shown in FIG. 9 comprises the information captured in the meta-data of the UIs of FIG. 6 and FIG. 7, and the information of the tool palette. This illustrates the reusable nature of the UI models.

3. Details of an Embodiment of the Present Invention

3.1 Network Diagram

Figure 10:
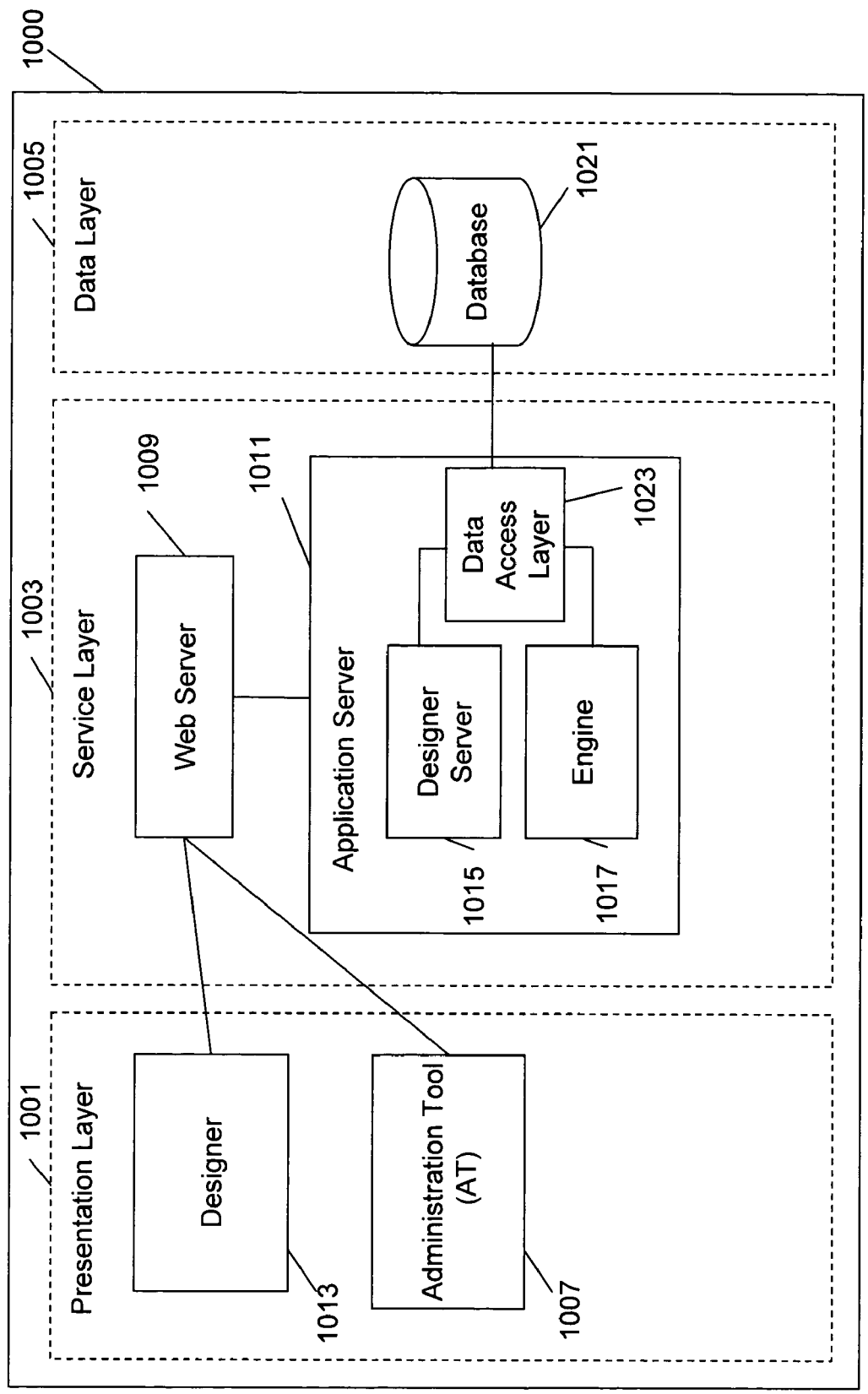
FIG. 10 is a network diagram of the system in accordance with an embodiment of the present invention.

Referring now primarily to FIG. 10, a network diagram of the system in accordance with an embodiment of the present invention is hereinafter described in detail. The present invention can either be used in conjunction with a framework as described in patent application Ser. No. 10/336,965, titled 'Business process technology for the enterprise', filed by Rage Frameworks, Inc. or on a loosely coupled basis. System 1000 allows for development and deployment of user interfaces for one or more applications on a loosely coupled basis. The network architecture supports three layers—a Presentation Layer 1001, a Service Layer 1003 and a Data Layer 1005.

Presentation Layer 1001 comprises a Designer 1013 and an Administration Tool (AT) 1007. Designer 1013 is a Java application used to create, debug and validate the UI models. Designer 1013 provides a visual modeling environment that allows the application designer to define, build and deploy UIs. An application designer creates UIs by modeling the UI requirements in a flowchart like manner. Modification of a UI is also done using Designer 1013 by modifying the visual flow diagrams that constitute the relevant UI. AT 1007 enables the administrator to perform administrative functions such as security management, log files maintenance, reporting and monitoring system activity.

Service Layer 1003 comprises a Web Server 1009 and Application Server 1011.

Web Server 1009 runs a Controller Servlet compliant with industry standard web servers. This Controller Servlet is a program that facilitates the connection of Designer 1013 and AT 1007 to Application Server 1011. Designer 1013 and AT 1007 interact with Web Server 1009 through HTTP(S) (Secure Hypertext Transfer Protocol). In an embodiment of the present invention, Web Server 1009 can handle both HTML and XML requests from Designer 1013 and AT 1007.

Application Server 1011 comprises three parts—a Designer Server 1015, an Engine 1017 and a Data Access Layer 1023. Designer Server 1015 facilitates User Interfaces of Presentation Layer 1001. Engine 1017 is the runtime execution module of System 1000. Engine 1017 serves (i.e. executes two types of requests) the requests generated by an application designer while developing and maintaining user interface models and serves the requests generated at runtime by the application for which the UIs have been created. Engine 1017 also houses the XML versions of the UI models created using Designer 1013.

Data Access Layer 1023 acts as a gateway to a Database 1021. Data Access Layer 1023 provides a set of standard interfaces, which are implemented by various Java beans. Data Access Layer 1023 is used when either Engine 1017 or Designer Server 1015 needs to access Database 1021. Data Access Layer 1023 also captures statistics related to database access. Statistics related to database access could be the query time, elapsed time and execution time. These statistics assist in database performance optimization.

The application designer interacts with Designer 1013 to create UI models and stores the validated models in Database 1021. The administrator interacts with AT 1007 to administer System 1000 and UIs created using System 1000. The user interacts with the applications modeled using Designer 1013. All these interactions generate requests that are serviced by Engine 1017.

Data Layer 1005 comprises Database 1021. Database 1021 stores all the UI models, i.e., the layouts, the validation rules and the database mappings. Database 1021 is a meta-database. Access to Database 1021 through Data Access Layer 1023 is provided through a connection pool using the Java Database Connectivity (JDBC) protocol.

3.2 Designer

Figure 11:
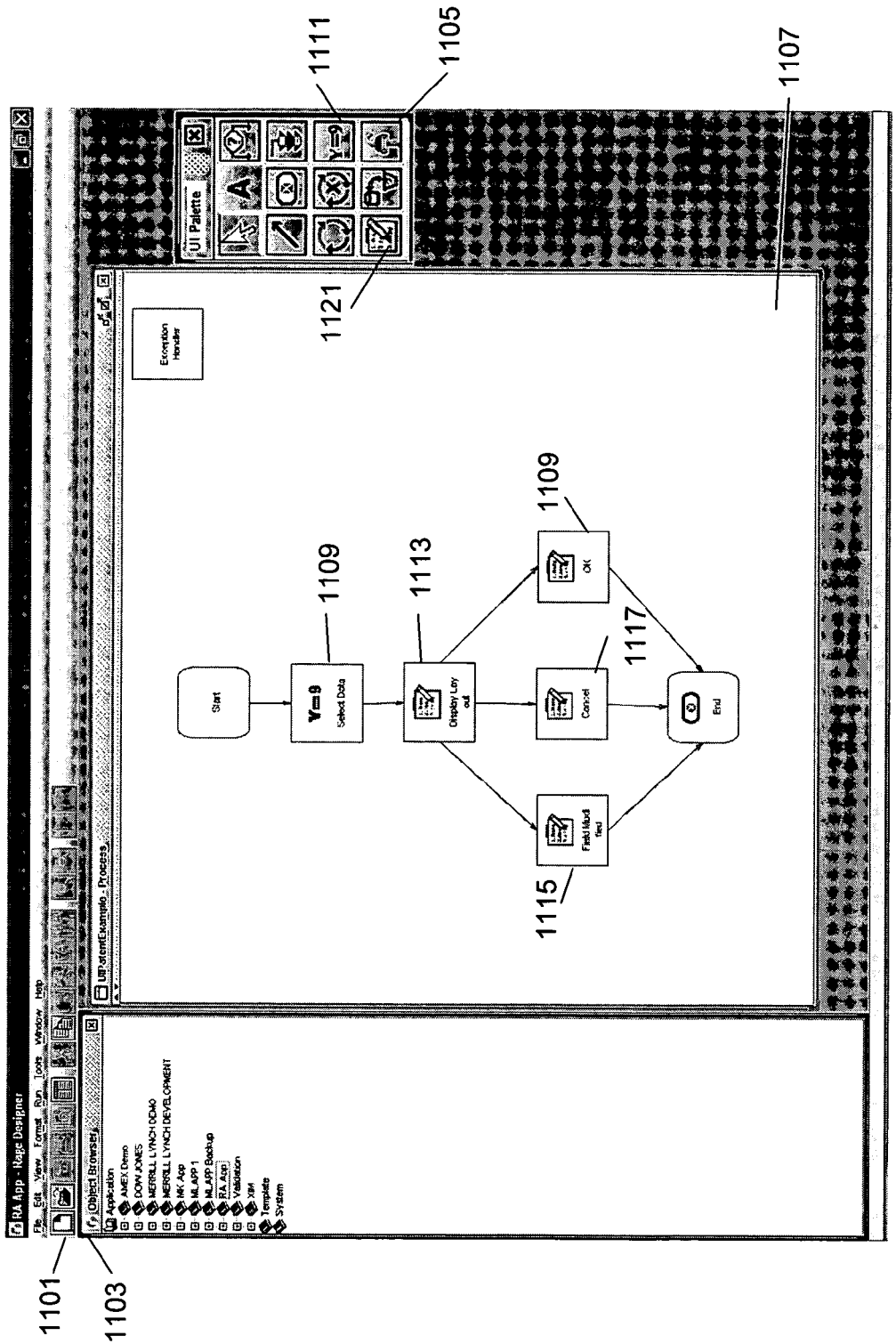
FIG. 11 is a screenshot of a Designer in accordance with an embodiment of the present invention.

Designer 1013 comprises an integrated set of modeling tools and abstract components that together allow the application designer(s) to model and validate all aspects of the UI application visually. Referring now primarily to FIG. 11, a GUI for the main screen of Designer 1013 is hereinafter described in detail. The illustration shows the GUI the way it would appear during a typical UI modeling session. The figure shows a Designer Menu System 1101, an Object Browser 1103 and a UI Tool Palette 1105. Designer Menu System 1101 provides a number of menu options to the application designer to create UIs and to validate them. Object Browser 1103 is another way for the application designer to navigate through the UI models created in Designer 1013 and/or to engage in modeling. Designer 1013 allows the application designer to create UIs for multiple applications, reuse whole or part of any application UI in another application, create UIs as templates, and designate certain UIs to be at the system level, forcing a higher level of security and access control.

FIG. 11 also illustrates a sample UI modeling session. In a UI workspace 1107, the application designer visually models the UI by dragging and dropping instances of the required components from UI Tool Palette 1105. The application designer may also click on the appropriate component name in Object Browser 1103 and use the right-click property as an alternative to the drag-and-drop process. For example, task 1109 is defined by picking an instance of a component 1111 from UI Tool Palette 1105 either by drag-and-drop or by right click property. Similarly tasks 1113, 1115, 1117 and 1119 are defined by instances of a component 1121.

A UI process in accordance with an embodiment comprises multiple tasks that are connected with each other. Every task performs a step in the overall process. A task is an instance of a component with UI specific run-time properties, i.e. a task is a business object that provides services specific to a UI process or collection of UIs. A component is a highly abstract object, which represents a function that is typically required in UI and provides generic services that can be made UI-specific by providing UI-specific properties. The UI specific properties are called meta-data. On supplying meta-data to a component, the component becomes a task.

While creating a UI, the application designer selects these pre-built components according to the requirements of the UI. The application designer thereafter creates tasks using the components by specifying run-time properties specific to the business process. Using Designer 1013, the application designer drags and drops these tasks and then interconnects them to model the entire UI. After connecting the tasks, the application designer specifies UI-level properties such as when to execute the UI process. These are called Process Triggers and they could be ad hoc, periodic or event based. An ad hoc scheduling is used, if the user needs to execute a UI at a specific time. The application designer may choose periodic scheduling, when, for instance, a user wants a UI to be executed every night, except on holidays. Event Triggers are attached to database activity. The user can have UIs triggered based on database activities such as insert, update and delete at table as well as column level. Thus, the application designer creates the entire UI in a flowchart-like manner by connecting pre-built components. Hence, neither coding nor programming needs to be done in order to create a UI. Therefore, anyone with none or very little coding and/or programming knowledge may create UIs that model highly complex business requirements rapidly and efficiently.

At the Enterprise level, this has several significant benefits. First, it shifts the focus and control of implementation to the process owner and not necessarily a technical, non business person. Second, it reduces the time to market. Third, it results in significant cost reduction.

UI development can be decomposed into application level and screen level.

Figure 12:
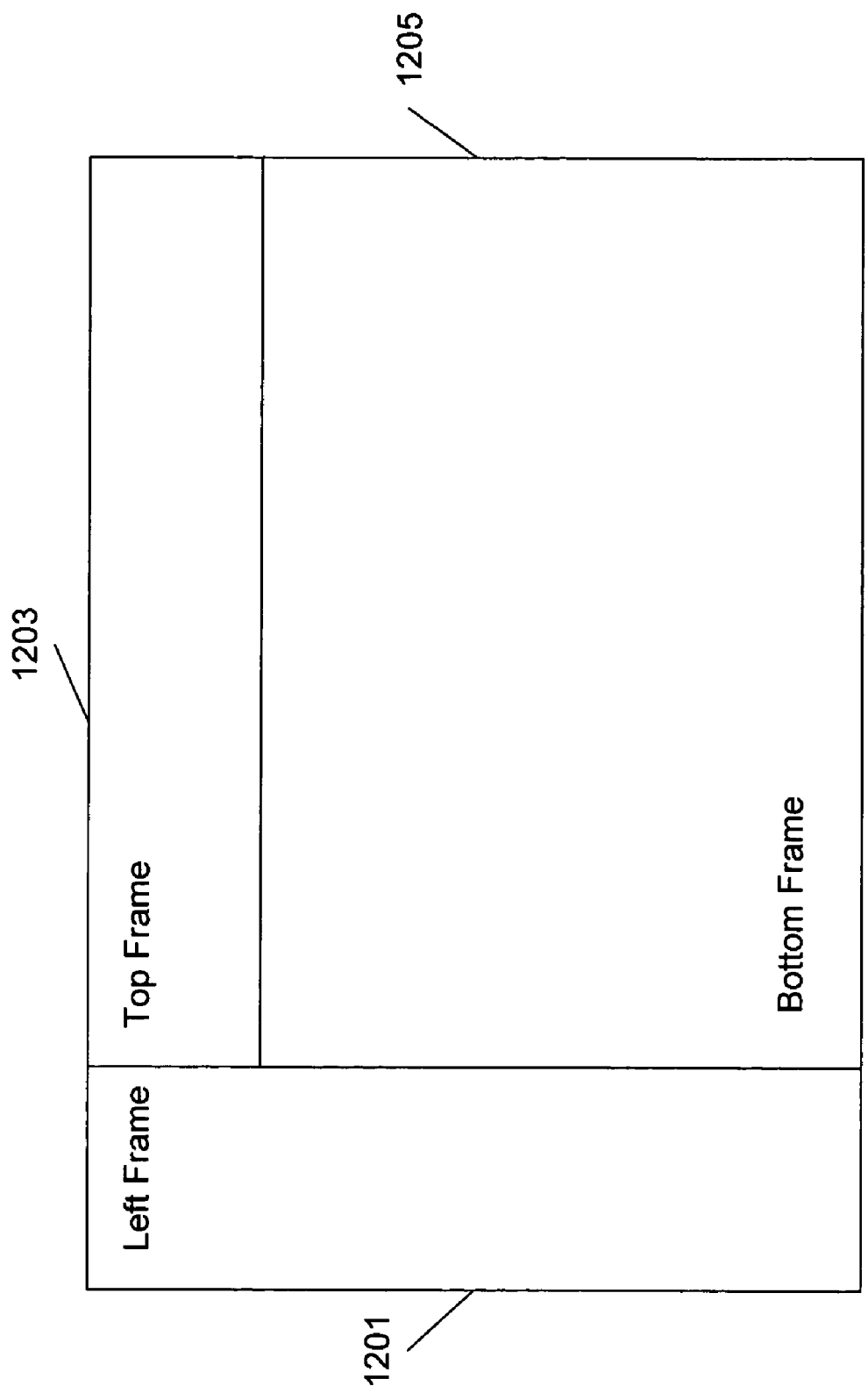
FIG. 12 represents a typical application layout structure for a browser-based application.

Application level development refers to the overall user interface structure of the application. Referring now to FIG. 12, a typical application layout structure for a browser-based application is shown. The application layout structure in FIG. 12 has been divided into 3 parts—a Left frame 1201, a Top frame 1203 and a Bottom frame 1205. This design envisions that each of the frames will contain a user interface screen. In accordance with an embodiment of the present invention, the logic relating to which screen to display in which frame is contained in Application Controller 307 (shown in FIG. 3).

Screen level development refers to the placement of controls (described with reference to FIG. 13) on the screen, the mapping of database fields to screen variables, validation of user action at the control level (e.g. validating values entered in a field) and at the layout level (e.g. validating values across fields) and the forwarding of screen information to Application Controller 307.

Figure 13:
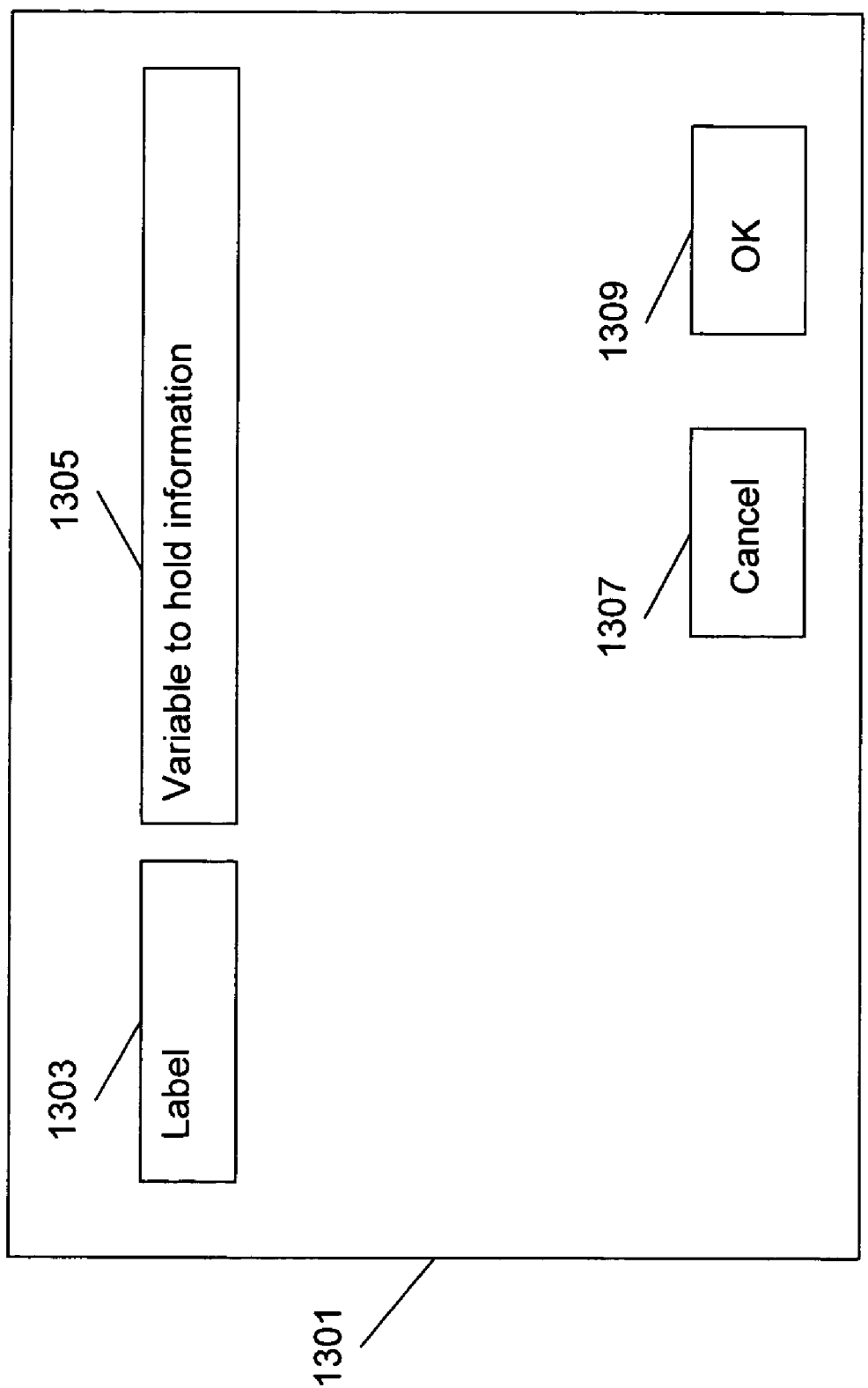
FIG. 13 is a user interface screenshot that includes the placement of controls on the screen in accordance with an embodiment of the present invention.

FIG. 13 illustrates a sample UI screen 1301 that includes the placement of controls on the screen. The controls placed on Screen 1301 are—a Label 1303, a Variable 1305 to hold information, a Cancel tab 1307 and an OK tab 1309.

Creating a new UI from an existing UI is even simpler in accordance with an embodiment of the present invention. The application designer may use an existing UI and make a copy of its template by using the "save as" feature. The copy is named and the tasks are changed/modified according to the requirements of the new UI. The properties related to the UIs are supplied in the tasks. The tasks are connected with each other to reflect the UI flow logic. After connecting the tasks in a logical flow, UI level properties are specified.

UI Tool Palette 1105 contains a representation of all the available components in the form of icons. While creating a business task using a business component, the application designer may either re-use an existing task (modeled previously) or create a new task. In either of the cases, UI specific properties for the business task are provided in the task properties screen. Double-clicking on any of the tasks displays task properties screen to the application designer. Task screens for different components are shown with reference to FIG. 15-24.

System 1000 provides a built-in Verifier for testing, troubleshooting and improving the UI and the task models modeled using Designer 1013. The Verifier provides a powerful and friendly mechanism to test and verify a UI process. Verification is done at two levels. First, the Verifier applies the pre-defined verifications for each task on the UI process being tested. Second, the Verifier gives the application designer the ability to step through each task in the UI process and verify it.

Each task may be verified by invoking the Verify option within Designer 1013. The Verify option runs a set of pre-defined verifications. The verifications are defined for each abstract component. Invoking the Verify option on a task prompts the application designer to input any startup parameters for the task, applies the verifications for the underlying component and presents the results with their severity levels in the Output window of Designer 1013.

In addition, the application designer can setup Watch variables and Break points. Very often, the application designer may want to observe the value of some intermediate information variables as the UI is being executed. Setting up Watch variables refers to the practice of identifying the variables that the designer wants to observe, the values of which the application designer wants to observe as the UI model being executed. Similarly, the application designer may want the Verifier to stop at some pre-defined points in the process so that the information in the memory of the process may be analyzed. Such points are referred to as Break points.

After the modeling of a UI is complete, the application designer may decide to deploy the UI using Designer 1013. Choosing the deployment option creates an XML version of the application UIs and stores them on Application Server 1011. This is done for performance optimization and has the additional benefit of not requiring a database for the application models at deployment.

There are a number of settings that Designer 1013 uses for modeling an application. These include the use of user locale providing date and time format, time zone and language appropriate to the user, resource location for strings and images, the location to store debug information, ability to enable or disable memory, and the enablement or disablement of memory caching.

3.3 Components

As stated before, UI Tool Palette 1105 contains an iconic representation of the components available to the application designer. Components may be of two types: flow and functional. Flow components allow the application designer to model some aspect of the process flow. Functional components, on the other hand, allow the application designer to model a function using business logic.

Figure 14:
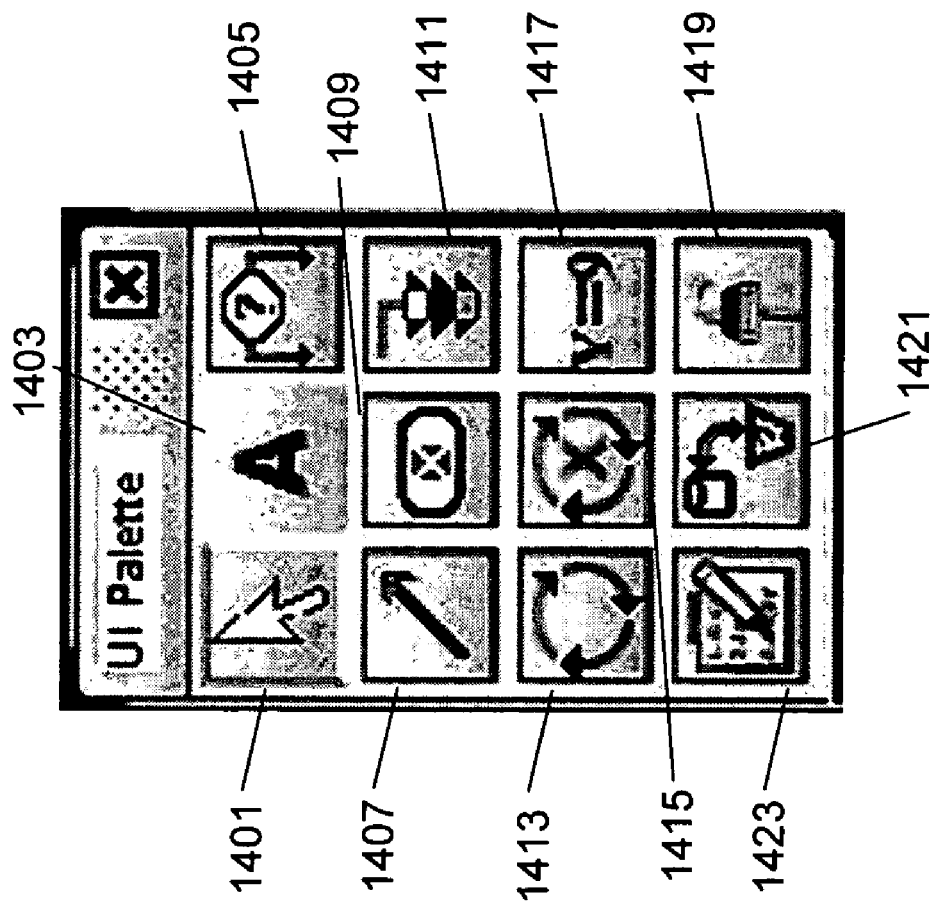
FIG. 14 is a screenshot of User Interface Tool Palette in accordance with an embodiment of the present invention.

FIG. 14 represents a screenshot of UI Tool Palette 1105. As already stated, UI Tool Palette 1105 comprises icons of the components that are required to model UIs in accordance with the present invention. The application designer selects the required components, specifies meta-data and connects them logically to model a UI. UI Tool Palette 1105 comprises the following components—a Selector component 1401, a Text component 1403, a Rule component 1405, a Line component 1407, a UI End/start component 1409, a UI State component 1411, a Loop Object 1413, an End Loop component 1415, an Assignment Object 1417, an External Object 1419, a Database access component 1421 and a Tasks component 1423. These components are described as following with reference to FIGS. 19-24.

3.3.1 The Anatomy of UI Component

Each component represents a dimension of functionality that is commonly required in UI development. By way of an example, the UI layout component represents the need to specify layout properties for a UI. All components are designed such that the functionality embodied in the component is externalized in the form of meta-data.

Each component has a similar structure and comprises three sub-parts. The first sub-part is a meta-data structure. "Meta-data" is a collection of application specific parameters. A component when provided with a meta-data becomes a task. The second sub-part of a component is a set of Graphical User Interface (GUI) objects. These objects encapsulate the meta-data structure and provide a user-friendly environment for the application designer to specify the meta-data. The third sub-part is a code segment that understands the meta-data structure and the implied functionality of the component. The code segment uses the meta-data and the abstract function of the component to perform a business specific task.

3.3.2 Flow Components

UI Tool Palette 1105 comprises a number of flow components including but not limited to, Selection 1401, UI Start/End 1409, Line 1407, Rule 1405, Loop Object 1413, End Loop component 1415, and Text component 1403.

3.3.2.1 Selection (Arrow)

Selection (arrow) component 1401 allows the application designer to select existing tasks and create new tasks. The application designer can also select multiple tasks and perform operations such as cut, copy, move and paste.

3.3.2.2 UI Start/End

UI Start/End component 1411 allows the application designer to denote where a UI Model starts and ends. There may be multiple instances of UI Start/End component 1411 in a UI Model. Multiple starts allow the application designer to design an execution strategy that serves more than one purpose. Multiple ends denote the natural end points in a UI Model.

Figure 15:
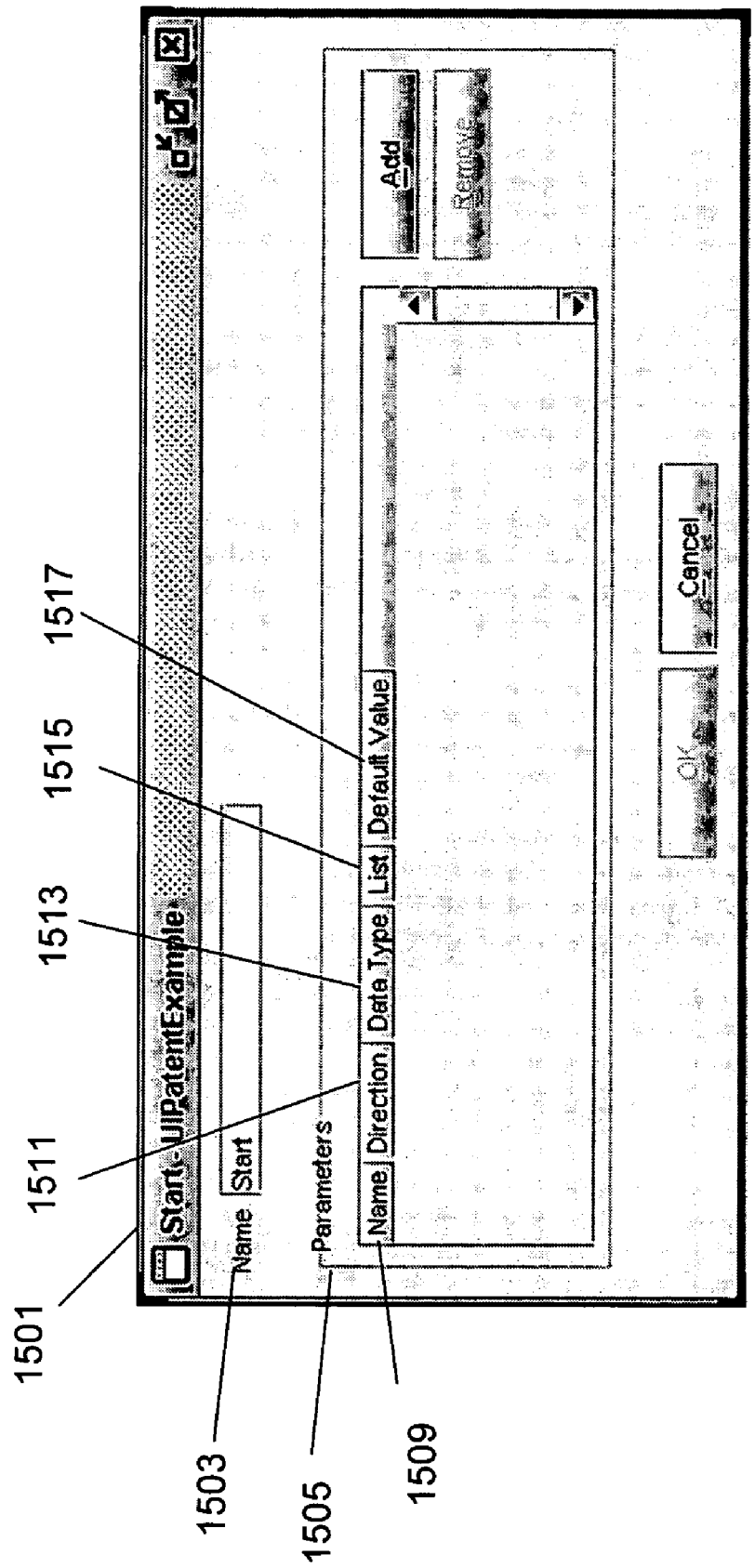
FIG. 15 is an exemplary screenshot for defining UI Start/End component's meta-data structure.

UI Start/End component 1411 also allows the application designer to design startup parameters required for the current UI Model to execute. These parameters are provided by the application or user that invokes the current UI. Referring now primarily to FIG. 15, the UI Start/End component's meta-data structure is hereinafter described in detail. The meta-data structure comprises an identifier for process start object 1501, a Name 1503 and a set of parameters 1505. Each parameter object in turn comprises a Name 1509, a Direction 1511, a Data Type 1513, a List 1515, and a Default Value 1517. The parameter ID is system generated and unique to the process. Name 1509 identifies the parameter to the application designer. Direction 1511 allows the application designer to declare whether the parameter is an incoming or an outgoing parameter. An incoming parameter of a task is defined as a parameter that is utilized by the task. An output parameter of a task is defined as a parameter that is generated by the task and is given as an output on executing the task. Data Type 1513 declares the parameter's type that may be String, Numeric, Boolean, etc. List 1515 allows the application designer to associate a list of values to the parameter. This implies that the parameter may have any one of the values in List 1515. Finally, Default Value 1517 allows the application designer to declare a default value for the parameter in case the parameter is not provided by the calling application.

3.3.2.3 Line

Line component 1407 allows the application designer to connect two tasks. In certain cases, the line connecting the two tasks needs to denote an outcome. For example, in the case of Rule component 1405, the process may branch into multiple tasks depending on the outcome of Rule component 1405. The line component's meta-data structure contains a line outcome attribute that is specific to each instance of the line component. In the case of Rule component 1405, the outcome is binary.

Figure 16:
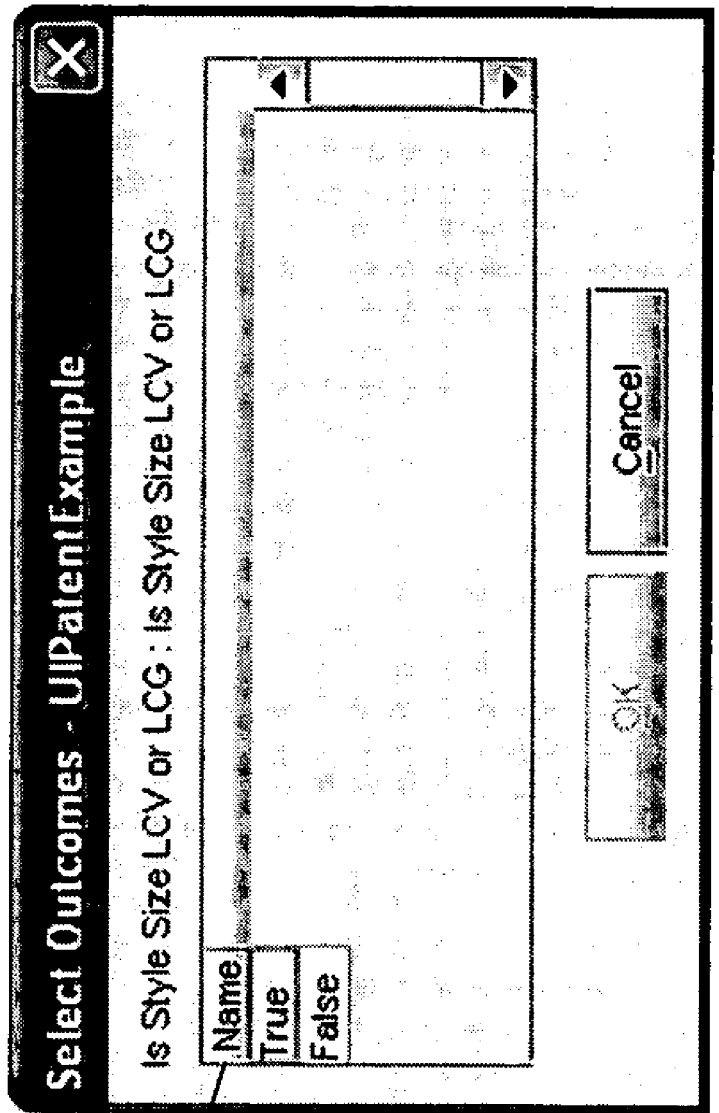
FIG. 16 is an exemplary screenshot for defining Line component's meta-data structure.

Referring now primarily to FIG. 16, the meta-data structure for the Line component 1407 comprises a name attribute with multiple possible values 1601. The name attribute refers to the outcome that the line is intended to represent.

3.3.2.4 Branching (Rule)

Rule component 1405 allows the application designer to create separate branches of execution in the process as a function of some condition. Rule component 1405 is both a Flow and a Functional component.

The meta-data structure for a rule reflects the following abstraction. The branching rule is a condition that may comprise single or multiple conditions. Each condition may be abstracted to contain a left-hand side (LHS) expression, a right-hand side (RHS) expression and a relational operator that relates the LHS and RHS. Relational operators are =, <, >, <=, >=, not equal to, contained in, contains, like, etc. When a rule has multiple conditions, the conditions may be connected using either conjunctively (AND) or disjunctively (OR) operators.

The expressions used in the rule component may include literals, system functions, process variables and input parameters. Consider a Business Rule component's example as shown below:

If (customer.risk>90
And m1>=100000)
Or (m2<=200000)
Then True
Else False
where, If, And, Or are associations
(,) are parentheses
customer.risk, m1, m2 are the LHS expressions
>, <=, >= are operators
90, 100000 and 200000 are the RHS expressions Referring now primarily to FIG. 17, the meta-data structure of Rule component 1405 is hereinafter described in detail. The meta-data structure for a rule extends over two levels. At the top level are attributes that are unique to the Rule: an Identifier 1701, a Name 1703, a Created By 1705, a Created Date 1707, a Version No. 1709, a Description 1711 and a Rule group 1713. Rule group 1713 allows the application designer to group rules into convenient classifications that improve their organization in Object Browser 1103.

The rule's condition represents the second level of the rule's meta-data structure. FIG. 17 displays the rule's conditions that can be one or many. The rule's conditions(s) are defined using table 1715. In the Primary column of table 1715, the application designer specifies the primary condition (for example 'if'). In the LHS column, left hand side of the condition is defined. Similarly, in the RHS column, right hand side of the condition is defined. In the Operator column the operator is defined that compares LHS and RHS. Examples of the operator comprise 'greater than', 'smaller than', 'equal to', 'not equal to', etc. The condition meta-data structure defined in table 1715 is further explained with reference to FIG. 18. Referring now primarily to FIG. 18, the condition meta-data structure is hereinafter described in detail. The meta-data structure allows the application designer to compose an LHS 1801 and an RHS 1803 of a condition using process memory information, information from the application database, and/or various inbuilt functions. Where LHS 1801 and RHS 1803 involve date/time information and a Unit 1805 and a Unit 1807 allow the application designer to define the time unit (business day, day, week, month, etc.).

Figure 17:
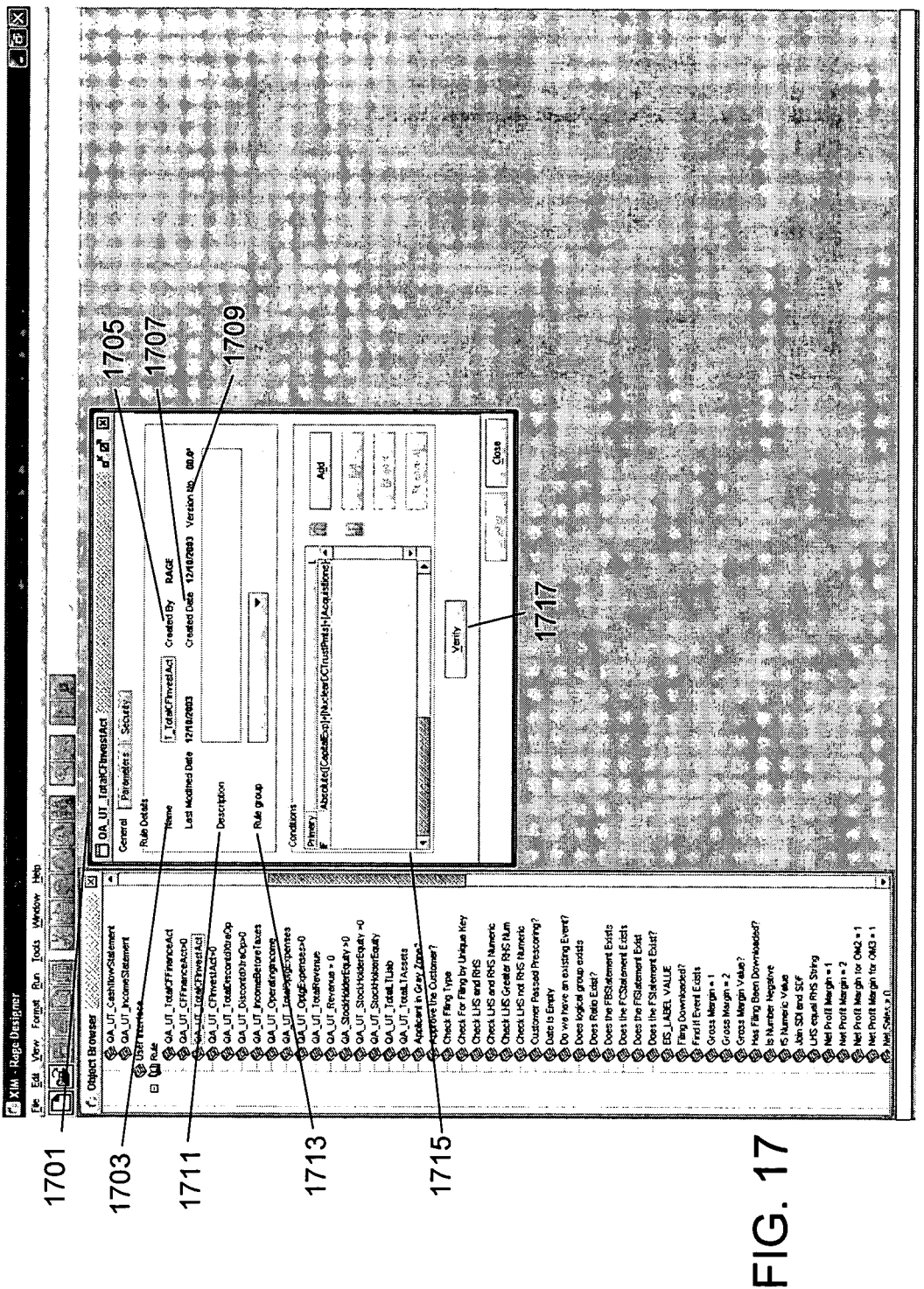
FIG. 17 is an exemplary screenshot for defining Rule component's meta-data structure.
Figure 18:
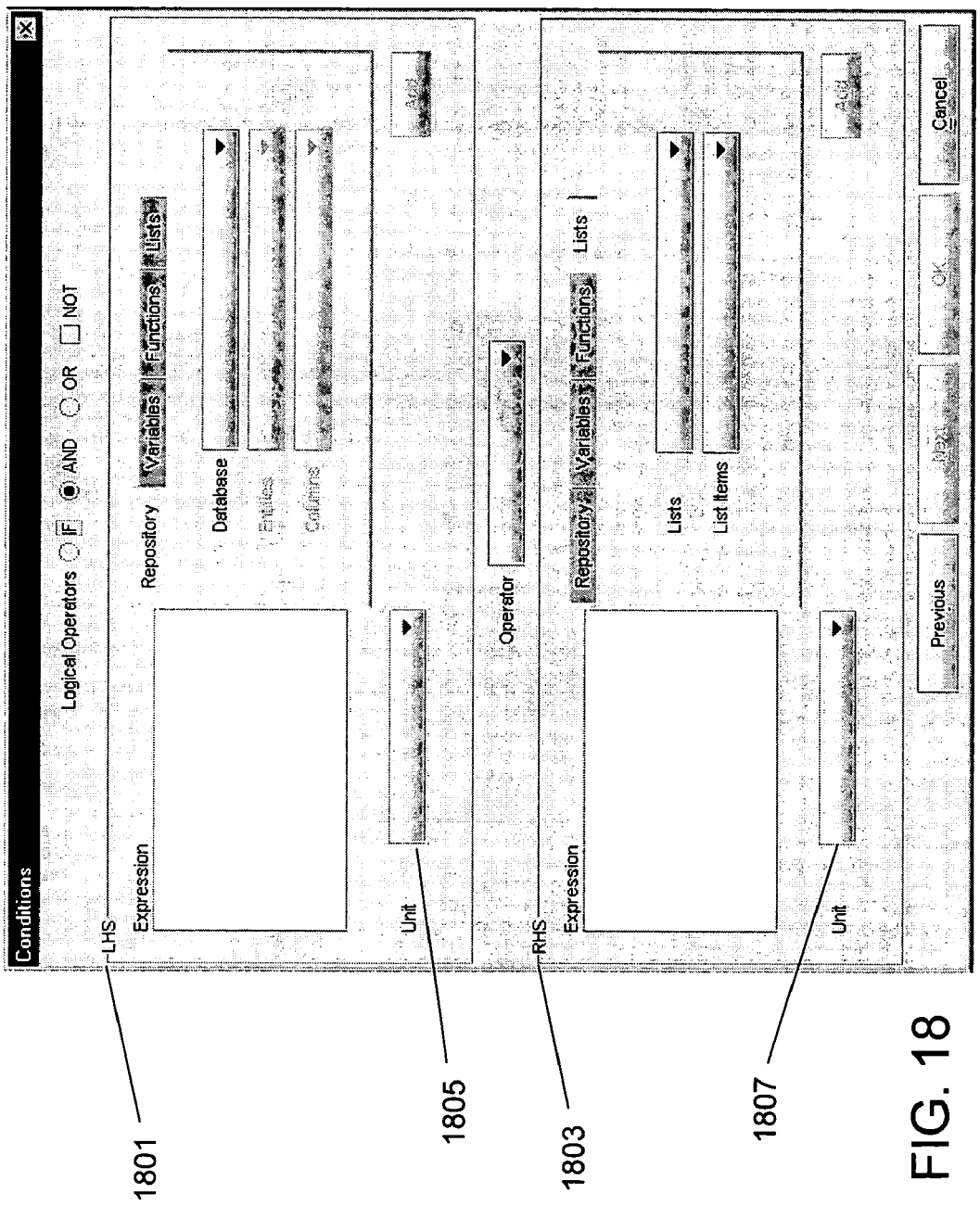
FIG. 18 is an exemplary screenshot for defining condition meta-data structure for the Rule component.
Figure 19:
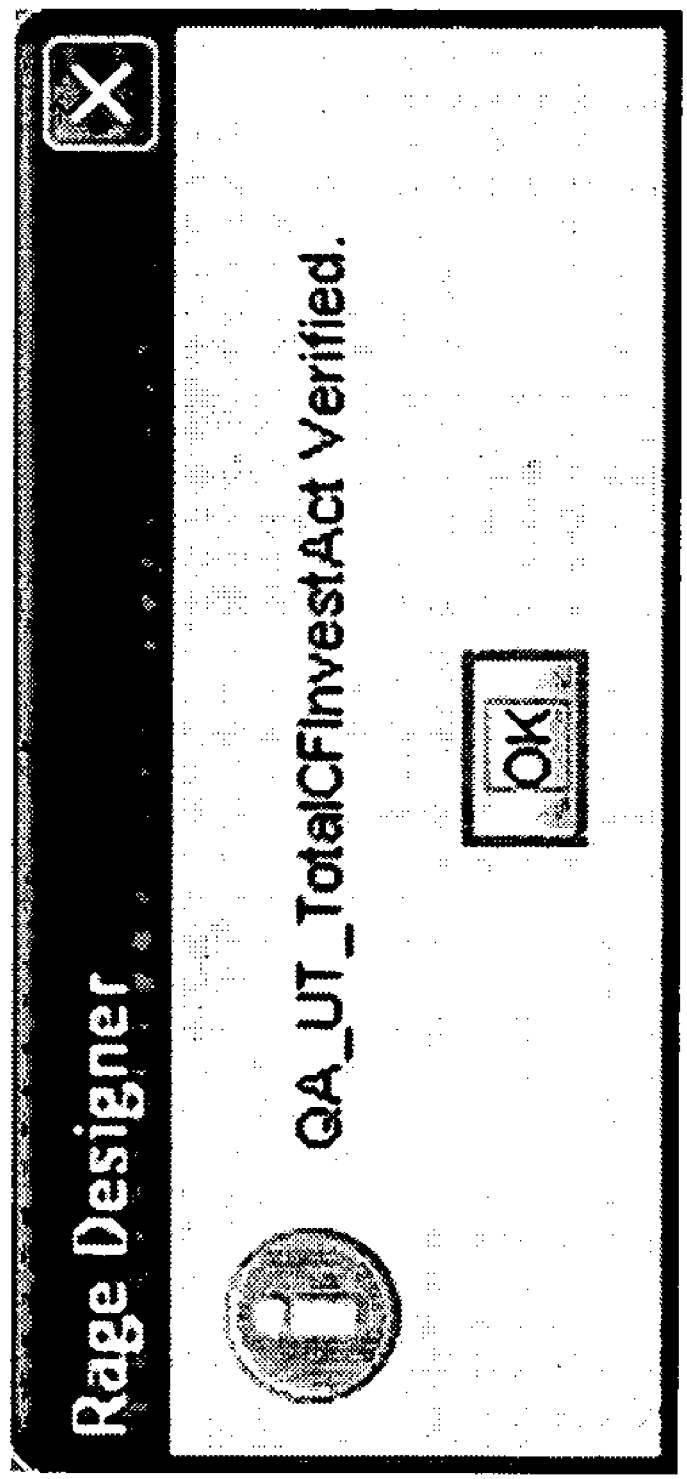
FIG. 19 is an exemplary screenshot output message presented to the application designer in case a rule is verified.
Figure 20:
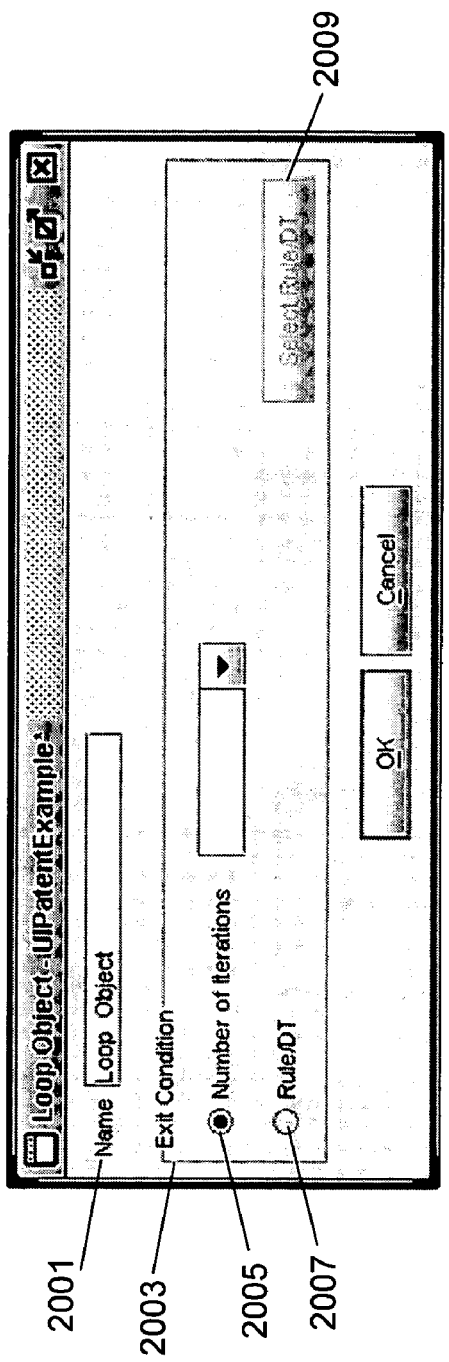
FIG. 20 is an exemplary screenshot for defining Loop Object's meta-data structure.

Once the application designer provides the meta-data for Rule component 1405, using screenshots shown in FIG. 17 and FIG. 18, the rule is verified. To verify the rule, the application clicks on verify option 1717 provided in the screenshot provided in FIG. 17. The rule is verified and the output of the verification is presented to the designer. The rule verification includes verifying LHS 1801 and RHS 1803 and the condition as a whole. Verification of LHS 1801 and RHS 1803 include verification of associated expressions and the variables used in the expressions. In addition, the meta-data provided using Screenshot of FIG. 17 is also verified. For example, verification is performed to check if the name of the rule provided using Name 1703 does not exceed the number of characters specified for the name. FIG. 19 shows the output message presented to the application designer in case the rule is verified.

3.3.2.5 Text

Text component 1403 allows the application designer to address the documentation and look and feel aspects of the UI model. Using this component annotation and formatting is defined. Annotation allows the application designer to add explicit textual comments to make the process more readable. Formatting allows the application designer to control the appearance of the process including the ability to specify font, background and foreground color. Using this component, font, background and foreground color is specified as meta-data.

3.3.2.6 Loop Object

Loop Object 1413 enables the application designer to model repetitive execution of tasks in within a process. The application designer specifies the meta-data for this component using the screenshot shown in FIG. 20. The application designer specifies a name for the instance of Loop Object 1413 using a Name field 2001. Using an Exit Condition box 2003 the application designer specifies the termination condition for the loop. To define the termination of the loop, the designer has two options—a Number of Iterations option 2005 and a Rule/DT option 2007. Number of Iterations option 2005 defines the termination when the number of iterations in the loop reaches the defined value. Rule/DT option 2007 defines the termination of the loop on the occurrence of a condition specified in a rule. This rule is selected using a Select Rule/DT button 2009. Using this button, the user selects an existing rule. This rule, an instance of Rule component 1405, is defined by the application designer in the manner described with reference to FIG. 17 and FIG. 18.

3.3.2.8 Task Component

Task component 1423 represents the functionality of calling Rule component 1405. Task component 1423 enables reusability of Rule component 1405 by calling Rule component 1405 across multiple UIs. In an embodiment of the present invention, it is assumed that business rules will generally need to be reusable across UIs and different applications. To facilitate such reusability, the designer is allowed to create the rules using parameters. In designing the UI process, the designer can then provide UI-specific data as parameters to the rule. Task component 1423 facilitates such modeling.

3.3.3 Functional Components

3.3.3.1 UI State

UI State component 1411 defines the state of the corresponding UI. State of a UI may be a 'user-defined' state or a 'system-defined' state. A user-defined state is externally monitored by the end user of the application. A user-defined state is defined at process level. A system-defined state is also associated with the process level. The system-defined state has three possible values—"Start", "Processing" and "Complete". "Start" indicates that the process has been selected for execution; "Processing" indicates that the execution of the process is going on and "Complete" indicates that the processing is complete.

Figure 21:
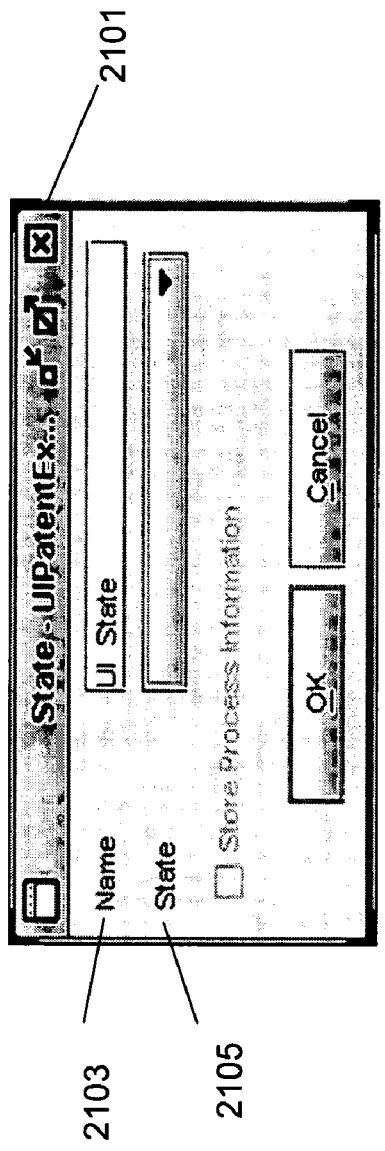
FIG. 21 is an exemplary screenshot for defining UI State component's meta-data structure.

Referring now primarily to FIG. 21, the UI State component's meta-data structure is hereinafter described in detail. The meta-data structure comprises an Identifier 2101 unique to the process, a Name 2103 and a State 2105 with multiple values. The multiple values for State 2103 refer to the 'user-defined' states. The values in State 2105 are provided by the application designer. For example, in the case of a loan application, the application may be in 'Data Entry', 'Investigation', 'In Process' or 'Processing Complete' states.

3.3.3.2 Assignment Object

Frequently, in a UI model, the application designer needs to retrieve information from a data source or create new information as a function of existing information. This is done through a transformation or formula and the new information is stored in the process memory for subsequent operations. Assignment Object 1417 reflects an abstraction of such functionality so that the application designer can specify the information needed without any programming.

Figure 22:
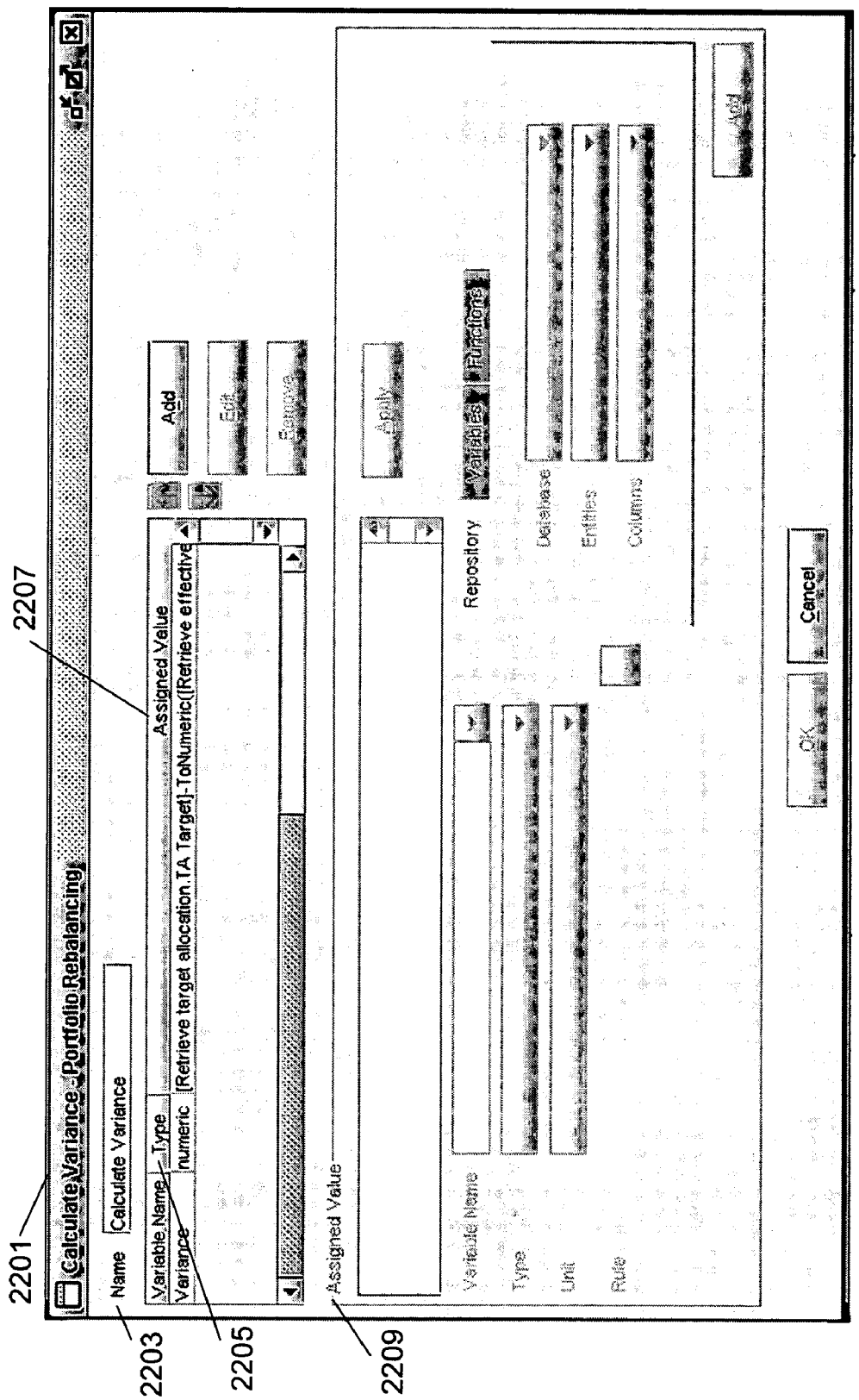
FIG. 22 is an exemplary screenshot for defining Assignment Object's meta-data structure.

Referring now primarily to FIG. 22, Assignment Object's 1417 meta-data structure is hereinafter described in detail. The meta-data structure for an instance of Assignment Object 1417 comprises a unique Identifier 2201 for the Assignment Object instance, a Name 2203, a Data Type 2205 and an Assigned Value 2207 (expression). Assigned Value 2207 is specified by Assigned Value box 2209. Here, the application designer specifies an expression using repository, variables and functions. As in the case of business rule, the meta-data structure allows the application designer to use any process memory information, information from the application database and/or built in functions to specify the assigned value. The expressions defined using Assigned Value box 2209 are reflected in Assigned value 2207.

Frequently, the application designer may need to create more than one variable. The meta-data structure allows the application designer to define multiple variable expressions in an assignment instance.

The corresponding assignment module in Engine 1017 has the ability to execute the expressions defined in Assigned Value 2207 fields at runtime without the need to translate the defined expressions into code.

3.3.3.3 Database Access

Database access component 1421 allows modeling of application data access through meta-data. This component performs the function of accessing data from Database 1021. For example, consider an UI that asks a user to login to authorize the user to access an application. Here, a Validate Login task is used while generating the UI. Validate login task is generated using Database Access component 1421. To validate login, the system needs to match the password supplied by the user with the password stored in the database for the user name used by the user. The password stored in the database is accessed by Database Access component 1421.

Figure 23:
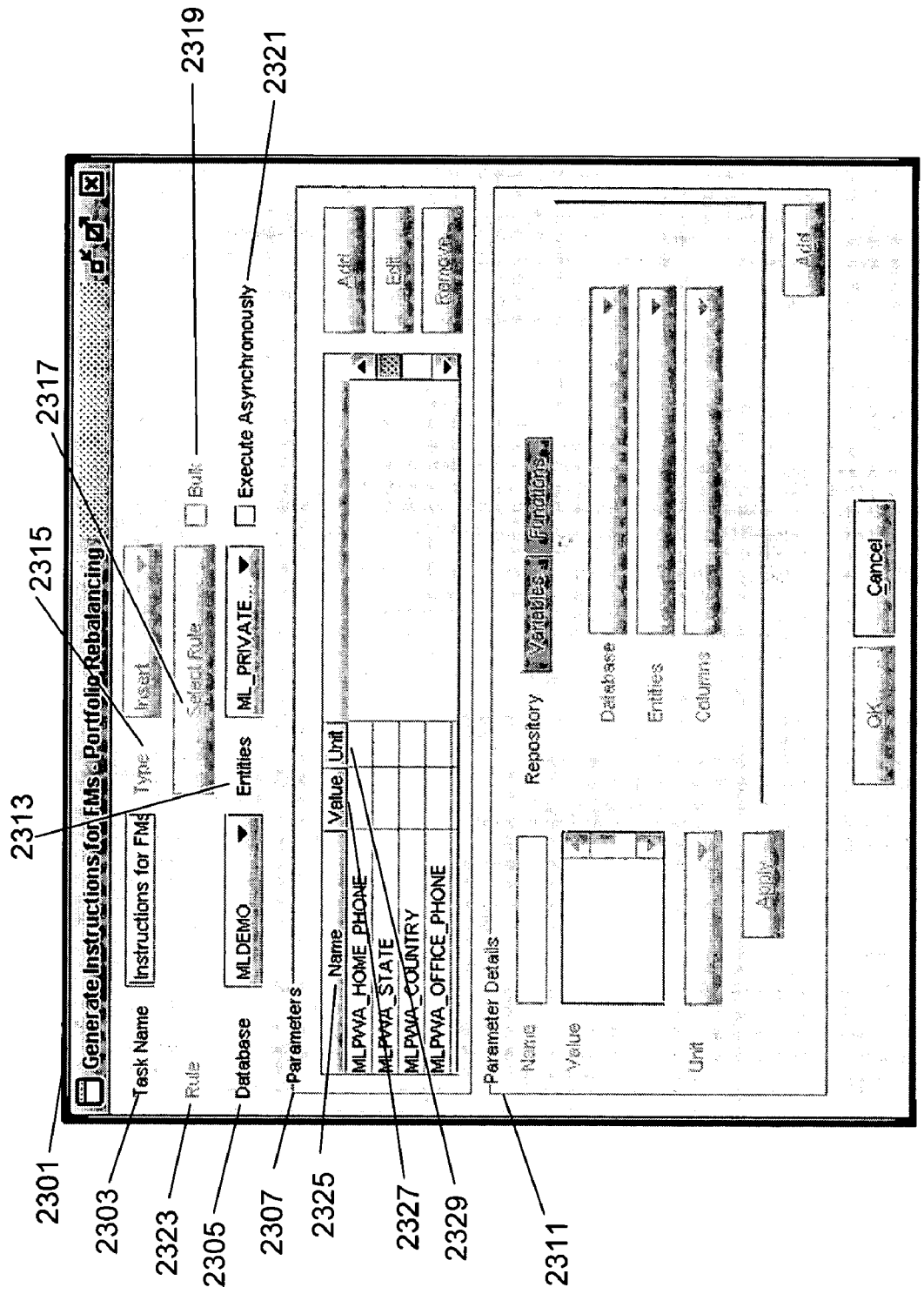
FIG. 23 is an exemplary screenshot for defining Database Access component's meta-data structure.

Referring now primarily to FIG. 23, the meta-data structure for Database Access component 1421 is hereinafter described in detail. The meta data structure for Database Access component 1421 comprises a unique identifier 2301 for the Database Access component instance, a Task Name 2303, a Type 2315, a Rule 2323, a Bulk Selection Flag 2319, a Database 2305, an Entities 2313, an Execution Asynchronously Flag 2321, and a set of Parameters 2307, which in turn includes the following attributes: a Name 2325, a Value 2327 and a Unit 2329.

Using the dropdown provided with Type 2315, the application designer specifies the task to be of one of four types—Insert, Update, Delete and Select. Depending on the type of database access task specified and the entity value chosen using Entities 2313, the application designer then provides values for the parameters in the chosen entity in set of parameters 2307. While specifying the values, the application designer may use any process memory information, information from the application database and/or built-in functions. This is done using a Parameter Details box 2311.

3.3.3.3 External Object

External Object 1419 allows the designer to invoke program modules outside the present invention. In this component, the designer specifies the parameters that the external program module may need as meta-data and also capture the status of execution of the external program module via Return Codes.

Figure 24:
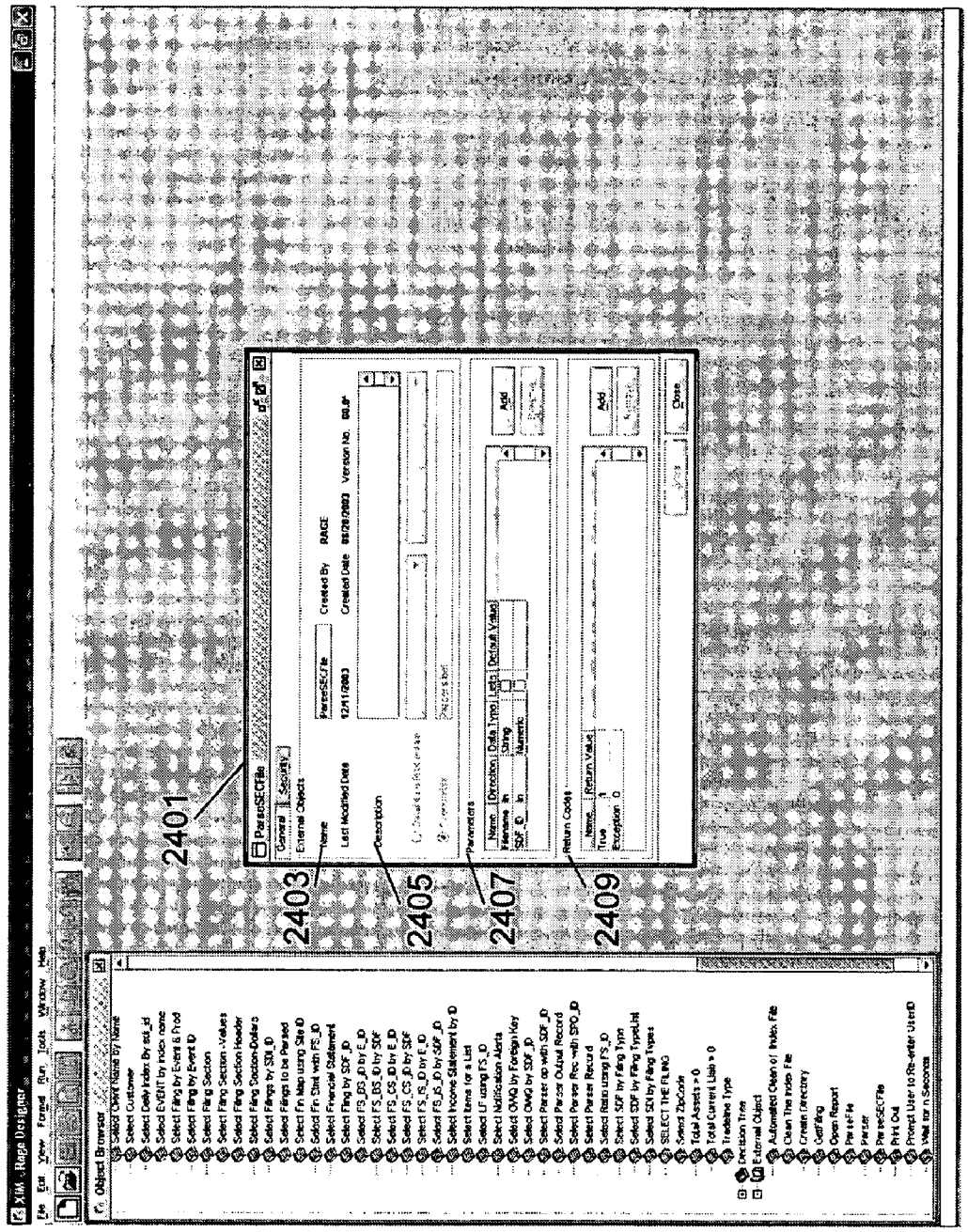
FIG. 24 is an exemplary screenshot for defining External Object's meta-data structure.

Referring now primarily to FIG. 24, the meta-data structure for the External Object 1419 is hereinafter described in detail. The meta-data structure for External Object 1419 comprises a unique identifier 2401 for the External Object component instance. Using a Name box 2403, the application designer provides a name to the instance of External Object 1419. The application designer provides the description of the instance of External Object 1419 using a Description box 2405. The parameters that the external program module may need are specified using a parameters box 2407. As already stated, the status of execution of the external program module is also captured via Return Codes. The Return Codes are specified using a Return Codes box 2409.

3.4 Administration Tool

AT 1007 is a Java application, which facilitates the system administration of System 1000 and applications created using System 1000. It connects with one or more Web Servers 1009 through the HTTPS protocol. The browsers supported by AT 1007 include Microsoft® Internet Explorer and Netscape Navigator.

AT 1007 provides various functions that enable an administrator to manage System 1000. These functions include management of various systems level activities as well as application level activities within System 1000. Examples of functions that facilitate systems level activities include starting or stopping Engine 1017. Examples of functions that facilitate application level activities include providing activity reports and statistics to the administrator. Also, application level data such as UI and task related statistics could be analyzed using AT 1007. For example, UI related information includes information such as Wait Time, Execution Time and UI State (for example START, PROCESSING, COMPLETE).

AT 1007 is also used to perform various security management functions of System 1000. For example, AT 1007 may perform user management functions such as creating user profiles and privileges either at the user and or group level. AT 1007 facilitates browsing and searching of system logs created by Application Server 1011 based on Event ID, component name, user name/id, request ID, date, etc. AT 1007 also facilitates browsing and searching of the security audit log.

3.5 Engine

3.5.1 Overview of Engine

Engine 1017 is the runtime execution module of System 1000 that serves (i.e. executes, interprets or processes) the UIs requested by a user. All requests that Engine 1017 serves effectively imply the execution or the continuation of some UI modeled using Designer 1013. Engine 1017 processes the requests by executing the tasks related to that UI. The tasks are executed using the Execution module inside Engine 1017. The manner in which Engine 1017 executes the requests generated by the user is explained by way of an example. When a user wants to use a web application designed using Designer 1013, the user clicks on an application link. This action sends a request to Engine 1017 for execution/continuation of the process corresponding to the application link. Engine 1017 receives and processes this request by loading the process (stored as meta-data) and executing the tasks specified in the process using the Execution module. Depending on the application, the process and user specific information such as User ID, permissions, etc., may be cached in the system memory for servicing ongoing requests from the user and/or for the process.

Engine 1017 has an ability to concurrently execute multiple process requests. This execution may require Engine 1017 to concurrently execute multiple instances of a single component. This may also require Engine 1017 to concurrently execute single or multiple instances of different components. An administrator can configure the number of maximum allowable instances per component while deploying System 1000. During installation, a default number is set for each component, based on available resources such as CPU and memory of the Server. Engine 1017 provides statistics to further fine-tune these settings depending on the desired response time and resource availability.

Engine 1017 uses a Message Service architecture to interact with loosely coupled subsystems such as Designer Server 1015 and Data Access Layer. In an embodiment, Engine 1017 uses asynchronous queued JMS messages to communicate with Designer Server 1015. The Java Message Service (JMS) is a common enterprise messaging Application Programming Interface (API) that is designed to support a wide range of enterprise messaging products. JMS make it easy to write business applications that asynchronously send and receive critical business data and events. Service requests are queued and handled using a combination of First In First Out (FIFO) and a priority criterion. Engine 1017 maintains a Message Queue for request management. The Message Queue comprises a Request Queue and a Result Queue.

The Request Queue contains requests that are forwarded to Engine 1017. These requests are prioritized on the basis of time and the priority level of the corresponding UI models. The Result Queue contains information resulting from execution of the requests. The Result Queue also comprises task summary information such as execution statistics. Both the queues are memory based. The Result Queue also performs the function of saving the information related to these queues in Database 1021. Both the queues have configurable "timeout" and "max size" properties.

3.5.2 Caching

Caching is used for optimization purposes in Designer 1013, Web Server 1009, Application Server 1011, and Database 1021. Caching is provided both at the time of modeling of a UI as well as at the time of execution of a UI.

When an application designer starts using Designer 1013 to create an application's UI, Designer 1013 caches all the information related to the application designer including the meta-data created and object Browser 1103. Web Server 1009 caches the information that is most frequently requested. Engine 1017 manages a central cache called Cache Manager on Application Server 1011. All the UIs within Engine 1017 share a common cache in the Cache Manager. During Startup of Engine 1017, all the components that have been configured to be cached at startup are loaded into the Cache Manager. A UI is cached the first time it is invoked, if it is not already cached in the Cache Manager. All the subsequent invocations of the UI retrieve the UI meta-data from the Cache Manager.

3.5.3 Engine Startup Process

Figure 25:
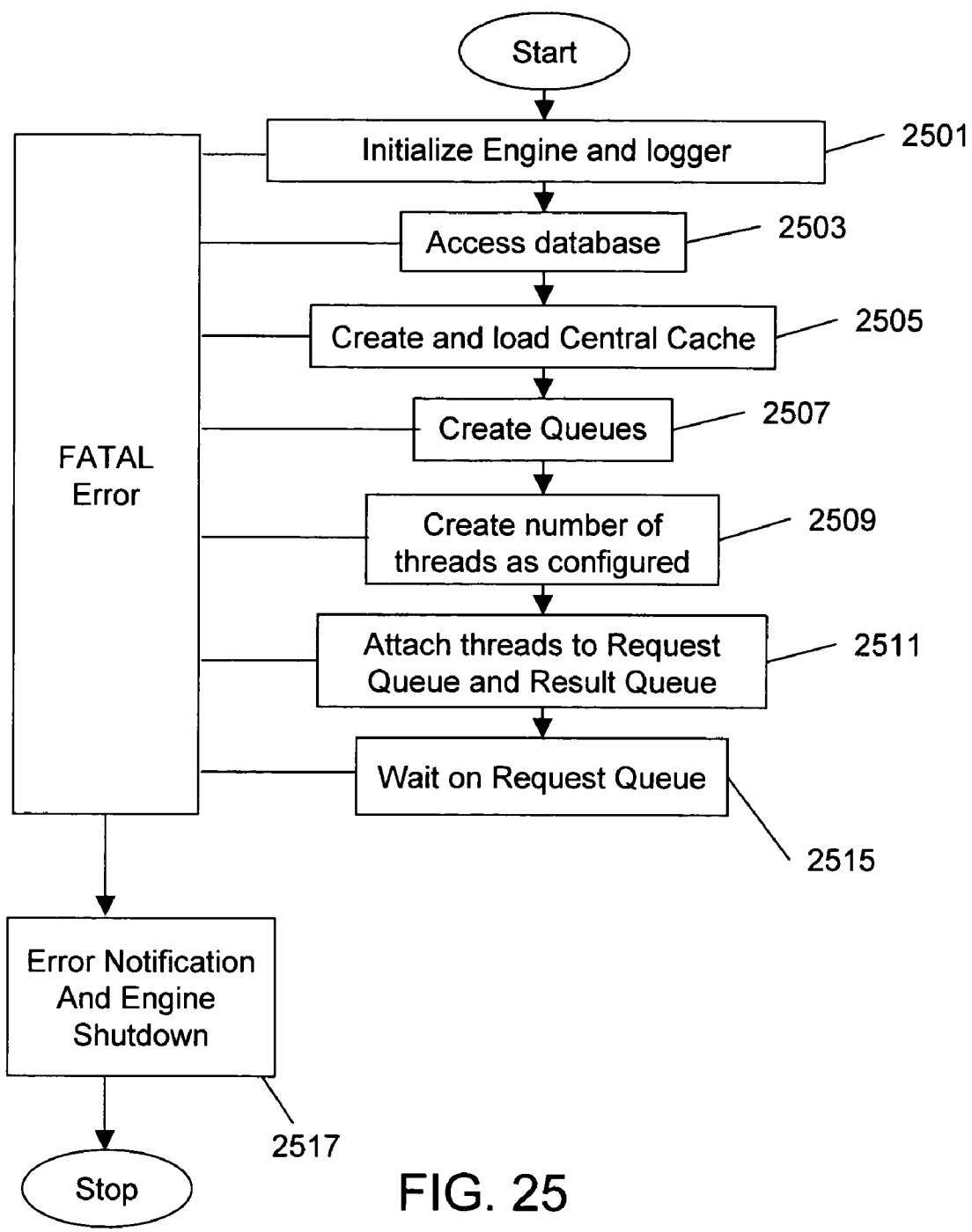
FIG. 25 is a flowchart depicting startup process for the Engine in accordance with an embodiment of the present invention.

Referring now primarily to FIG. 25, Engine 1017 startup process is hereinafter described in detail. At step 2501, Engine 1017 is initialized. In the startup process, Engine 1017 reads a number of parameters specified in the App Server Configuration XML file. These parameters include—Mail server settings, Logger settings, the number of rollover files, the email IDs for the administrator alerts and the severity level and the number of times Engine 1017 will try to run a failed request. Engine 1017 reads the User ID and the password and decrypts them. Further, Engine 1017 initializes the Log Writer and configures alerts for messages of different severity levels. The Log Writer writes log messages to an ASCII text file.

Next, at step 2503, Engine 1017 accesses Database 1021 through Data Access Layer 1023. Data Access Layer 1023 connects to Database 1021 using a JDBC connection pool. At step 2505, Engine 1017 creates and loads the Cache Manager. To load the Cache Manager, Engine 1017 loops through every component and identifies those that have their 'Load at Startup' property set to 'Yes'; this is set by the application designer while modeling the application. Thereafter, Engine 1017 locates the components' XML definition files from Application Server 1011 and converts the XML files to Java objects. This conversion is achieved using a third party software Castor™ that maps XML files to Java objects.

Next, at step 2507, Engine 1017 receives requests from the users/applications and creates a Request Queue and a Result Queue (as described in section 3.5.1). At step 2509, Engine 1017 creates a number of threads as configured by the application designer or as set by default. At step 2511, the threads are attached to the Request Queue and the Result Queue.

The Scheduler prioritizes the results in the Request Queue. The Scheduler looks for requests that were abnormally terminated during the most recent shutdown and assigns them the highest priority. After executing the priority requests, Engine 1017 waits for new requests to arrive in the Request Queue at step 2515. If a request arrives, System 1000 goes to step 2511. While performing any of the steps 2501-2515, if a fatal error occurs, System 1000 jumps to step 2517. At step 2517, an error notification is sent and Engine 1017 shuts down. Engine 1017 keeps processing as long as there are requests to process and is in a wait state when there are no requests, until it is shut down.

3.5.4 Engine's Process Execution Flow

Figure 26:
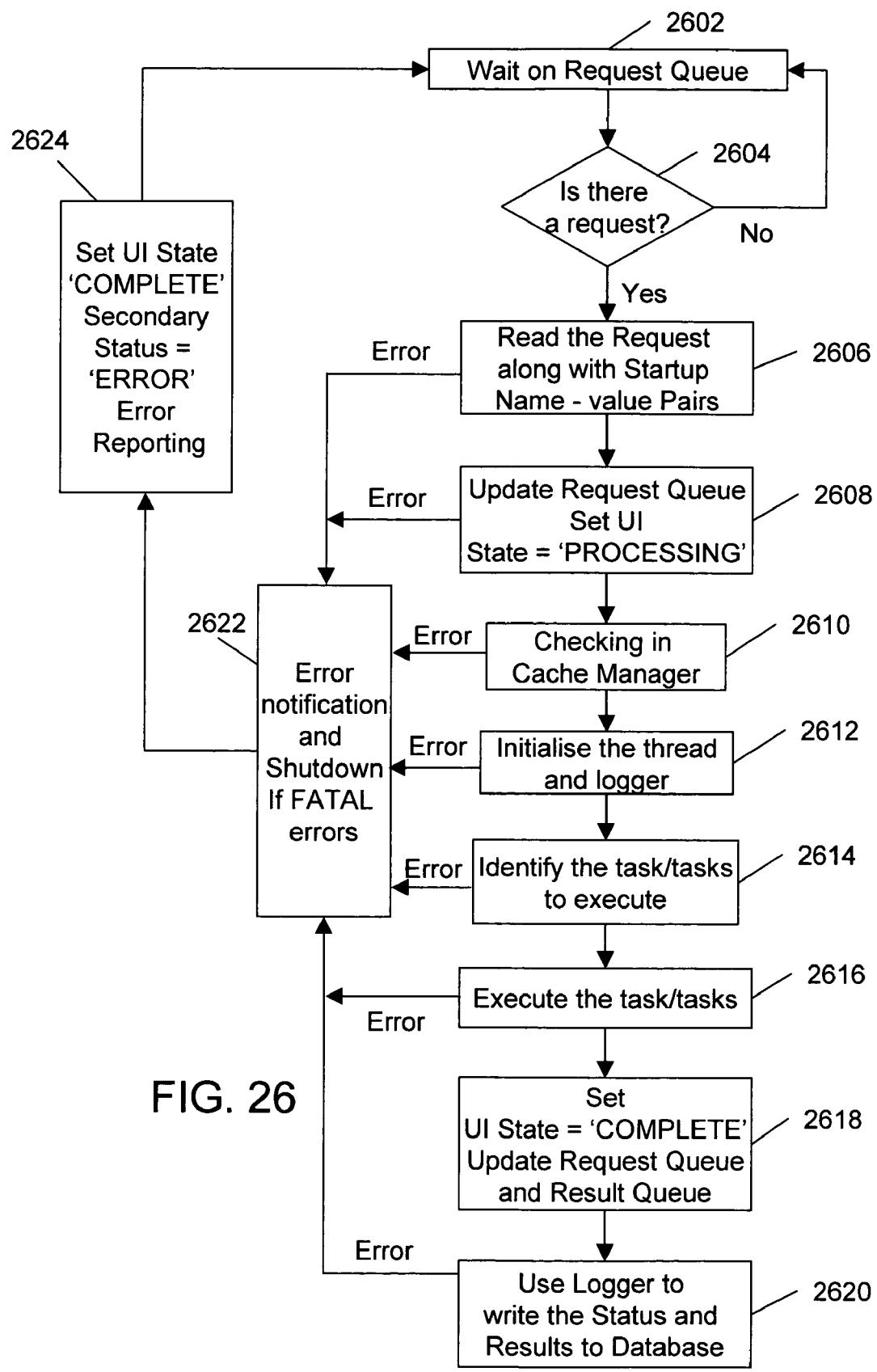
FIG. 26 is a flowchart depicting the sequence of tasks executed by the Engine in servicing a user request in accordance with an embodiment of the present invention.

Referring now primarily to FIG. 26, the sequence of tasks executed by Engine 1017 in servicing a request is hereinafter described in detail. When a request is selected to be executed from the Request Queue, all the business tasks of the corresponding UI are identified. The selection of a request for execution depends on the execution time attribute of the request. The execution time attribute can have a future date and time value, if required. As described in the previous section, the order of selection depends on the priority of the associated UI. Engine 1017 reads the earliest request from the sorted Request Queue based on the condition that the scheduled date-time is lesser than the current date-time. After selecting a request for execution, Engine 1017 identifies the tasks that need to be executed to process the request. Engine 1017 has an Execution Module, in which execution of these tasks takes place. The results of the execution are written to the Result Queue. After processing the request, Engine 1017 goes back to wait state if there are no more requests to process.

At step 2602, Engine 1017 waits for a request in the Request Queue. At step 2604, Engine 1017 checks if there is a request in the Request Queue. If there is a request in the Request Queue, System 1000 moves to step 2606, otherwise it goes back to step 2602 and waits for a request. At step 2606, Engine 1017 reads the request along with the Startup parameters. After reading the request, Engine 1017 updates the Database Queue (used for temporarily storing a request and its status in Database 1021 during its execution) and the UI State (explained in section 3.4) is set to "Processing" at step 2608. At step 2610, Engine 1017 checks whether the requested UI is already in the Cache Manager; if the process is not present, Engine 1017 fetches the corresponding XML files and converts the XML files to Java objects and loads the process into the Cache Manager. At step 2612, Engine 1017 initializes an EJB instance and the Log Writer. At step 2614, Engine 1017 identifies the tasks that constitute the process. After identifying the tasks to be executed, Engine 1017 executes the tasks at step 2616. The tasks are executed either synchronously or asynchronously, as configured, until an End Task is reached. At step 2618, UI state to 'COMPLETE' and the Request queue and Result queues are updated. At step 2620, the Logger writes the status information and the results in Database 1021.

While performing any of the steps 2602-2620, if a fatal error occurs, System 1000 jumps to step 2622. At step 2622, an error notification is sent and Engine 1017 shuts down. At step 2624, the UI State is set to 'COMPLETE' and the user is informed that an error has occurred. Engine 1017 keeps processing as long as there are requests to process and is in a wait state when there are no requests, until it is shut down.

3.5.5 Exception Handling

Each process has a built-in Exception Object and Handler. System default actions are taken when an exception occurs. System default actions can be over-ridden by the application designer at the time of modeling. The application designer may provide custom alerts and exception messages at the UI level.

Any message generated through System 1000 can be of the following severity level: Informational, Warning, Debug, Error and Fatal. As earlier described, at step 2622, if an exception is generated with a severity level of type "Fatal" or "Error", the execution of the process stops and the Process State of the process is set to "Error".

Figure 27:
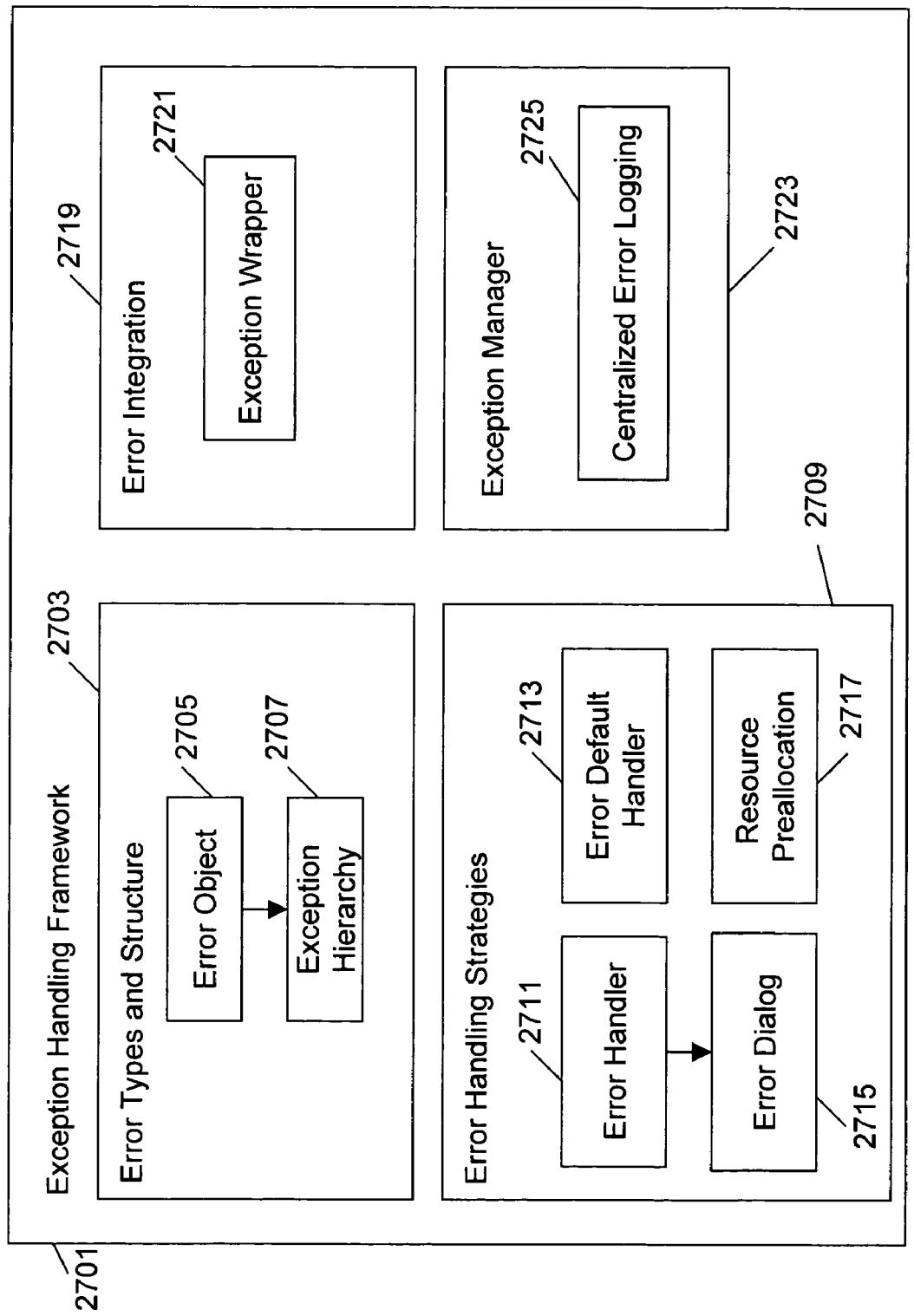
FIG. 27 shows the Exception Handling Framework in accordance with an embodiment of the present invention.

Referring now primarily to FIG. 27, the Exception Handling Framework is hereinafter described in detail. This framework is designed independent of client technologies. It could be used with multiple clients such as a Java application, an applet, a servlet and Personal Digital Assistants (PDAs). In accordance with an embodiment of the invention, implementation has been provided for a Java application and a servlet.

Exception Handling Framework 2701 comprises a field called Error Types and Structure 2703. Error Types and Structure 2703 contains an Error Object 2705 and an Exception Hierarchy 2707. Error Object 2705 encapsulates all the information about an error and its context. The application designer can create and use the error objects like other data.

Exception Handling Framework 2701 comprises another field called Error Handling Strategies 2709. Error Handling Strategies 2709 contains an Error Handler 2711, which is the error handling subsystem used by the client to process an error. Error Handler 2711 uses an Error Dialog 2715 to display the error message on the client's screen. Error Handling Strategies 2709 also contains an Error Default Handler 2713 to avoid any exceptions that are not handled by Error Handler 2711. A Resource Preallocation 2717 in Error Handling Strategies 2709 performs two functions. First, it creates Error Dialog 2715 at Startup and then shows or hides Error Dialog 2715, as appropriate. It also implements an abstract factory for all the exception handling classes and performs memory management of the exceptions.

Exception Handling 2701 also comprises an Error Integration 2719, which further comprises an Exception Wrapper 2721. Exception Wrapper 2721 integrates a ready-to-use library into Exception Handling Framework 2701.

Exception Handling Framework 2701 also comprises an Exception Manager 2723. Exception Manager 2723 comprises a Centralized Error Logging 2725. Exception Manager 2723 uses Centralized Error Logging 2725 to log the relevant exceptions. All the exceptions are filtered and the relevant exceptions are identified on the basis of their severity level. All the error messages are written to the log file based on the system wide severity level. The system state can have one of the following possible values—Start, Processing, Complete, Error and Exception. Applications can proceed or abort depending on the severity of the error.

3.5.6 Logging

System 1000 creates an application log file, which may be accessed by Designer 1013 and AT 1007. The application log file is stored on Application Server 1011 and maintains a log of information related to functioning of various applications. The log would include a list of all the requests for a given application and a list of errors messages; the application log file is different from the log files produced by the J2EE Server, the Web Server, Oracle or UNIX.

The application log file supports filtering on the basis of Request Identifier or User Identifier. This filtering of information enables a user or an administrator to view the log file by requests or users.

All the application error messages are captured in a resources bundle located on Application Server 1011 and are accessed by Web Server 1009. Application error messages can be broadly divided into two categories—System-defined messages and User-defined messages.

System-defined messages are pre-defined within System 1000. A couple of examples of system-defined messages are: "The input file does not correspond to the definition specified in the connector", "Connection to the remote system has been lost due to a communications failure". The first message implies that the file being read did not match the specifications about the file that were defined in the connector factory instance. Similarly, the second message implies that the connection with the remote system was lost most likely due to a communications failure.

User-defined error messages are defined by the application designer using Designer 1013. For example, a validation in the User Interface component may need to generate an error message to the end user of the application. As with system messages, user defined messages may be assigned severity levels. Users have the capability to manipulate the messages at runtime.

All the system and user-defined messages in various languages are stored in a global resources bundle. All the messages are associated with an internal code. The resource bundle is cached whenever Web Server 1009 accesses the resource bundle. All the components of Engine 1017 and Data Access Layer 1023 use the resource bundle. For example, a stored procedure has an exception and it returns a code to Data Access Layer 1023. Data Access Layer 1023 converts the code to a message in the language based on the system locale and the user locale.

3.6 Database

All the required information for the functioning of the system is stored in Database 1021. Database 1021 is a collection of resources such as databases, tables, columns and their extended attributes. Every component within Engine 1017 is built on top of Database 1021. Database 1021 describes meta-data about meta-data. Designer 1013 uses Database 1021 to define and create objects from components.

Database 1021 stores information related to Fields, Labels, Lists and Substitution Tables. Fields, Labels and Lists are used for creating GUIs. Labels are used for displaying some information to the users. Fields are used to hold information related to the display labels. Lists are used in GUI where the items within a list box are subject to frequent changes. Lists are also used to hold meta-data that may change and the user needs to have an easy access to manage the contents of the list.

If a new data model or a set of new database objects such as tables and indices are created using any commercial Data Modeler tool, they could be accessed by System 1000 once the changes are updated in Database 1021, using the Update procedure. Similarly if a new XML schema needs to be accessed by System 1000, the schema is created using a separate tool and an Update procedure is executed, so that System 1000 begins to recognize the schema. The Update procedure loops through all the database objects and stores their descriptions and attributes in Database 1021. Once the objects are stored in Database 1021, they are accessible to all the components.

3.7 Security

Application Server 1011 provides security services including Authentication, Authorization, Administration and Auditing.

Authentication is the primary identity mechanism that is based on User ID and password. Authentication is used to manage account of a user in System 1000. In an embodiment, Authentication is supported by an API based on XML. For third party applications, the API support for user management is provided through Web Server 1009. The Authentication service is accessible as a task, which in turn is accessible through a process. In other words, the Authentication service is provided as a task within a process.

The Authorization service controls the access of system resources based on the role of a user. The role of the user is generally based on the hierarchy within an enterprise. The Authorization service applies constraints on the access of the resources by a user on the basis of the user's role. The Access control includes functionality level access control and component instance level access control.

The Auditing service is used to track security events in System 1000. The Auditing service provided in System 1000 is file based. The architecture used for Auditing is the same as that used for Logging. SMTP messages are used to provide alert information regarding Critical Audit Events.

The Administration service relates to delegating user administration. The Administration service provides bi-directional synchronization of System 1000 with external systems. Audit message management also takes place through the Administration service.

Consider an example wherein all the security services get used. When a user signs-in for the first time, a user profile is created for the user. The user profile may be created by an administrator or a process through an API call to Application Server 1011. The administrator also creates roles and associates the users with the roles. The user submits his or her credentials in an encrypted channel to Web Server 1009, using a 128-bit Server Digital Certificate. For every subsequent login of the user, a token is generated and attached to the user's browser, after authentication is successful. The token and the session information is encrypted and attached to every request. This information is attached in the HTTP header or the XML element for both the templates or dynamically generated pages. If a token is not found attached to a request, the user is redirected to the login screen. Application Server 1011 looks for a token in the request when the user tries to access a resource. The resources can include a toolbar, a button menu, a menu-item or an edit box in Designer 1013. The Authentication service accesses the user database, caches the user credentials and allows the user to access the protected resources.

AT 1007 provides a GUI to define access control, group and user management. Database 1021 stores the security rights by storing the list of users that do not have access to a resource. A list of users that do not have access rights for an object is stored as this list is likely to be shorter as compared to users with access rights. Some examples of groups for resource access are—Designer Group, AT Group and Applications Group. For example, an Application Group consists of a group of users that are provided with rights to use the application. The User Table keeps track of all the users of a particular application.

There may be a set of access rights associated with a resource. For example, a user may be provided with one or more of the following access rights—Full Access, Create, Read, Modify, Delete and Execute. The rights for a resource are defined at the time of creation of a new object. Default rights for a new object provide Full Access to the creator and Read and Execute rights to every other user.

3.8 Additional Features

3.8.1 Internationalization

The system supports internationalization and thus may be used in any part of the world. All the software components of the overall system are completely internationalized and capable of localization to any language, including multi-byte character systems (MBCS). All the messages and the GUI labels such as menu and control labels are also internationalized. Based on the user's locale, the corresponding resource bundle is bound to the client. The applications generated using System 1000 are also internationalized. All the date-times are stored in Universal Time format and appropriate conversions are made before showing it to the user.

The servers in the system operate on English Sun Solaris. The clients run on US English or the International version of Windows. The database and XML use UTF-8 (Unicode Transformation Format-8) encoding.

The language of the Oracle database may be set to the required language according to the user's preference. Language in the database is set by using NLS_LANG. The default value of NSL_LANG is AMERICAN_AMERICA.UTF8. The character set encoding is set to UTF-8 in INIT.ORA startup file for Oracle. The default LANG environmental variable for the operating system is en_US. The LC_ALL category is selected so that character handling, monetary formatting, date-time format and sorting rules depend on the selected locale.

Engine 1017 stores messages in log or audit files in System 1000 based on server locale. All the messages that are written to the log file are picked up from the resource bundle based on language ID. The system is made MBCS (Multibyte Character Set) aware. MBCS is used for character sets that contain large number of different characters, for example the Asian language character sets. The system supports the conversion of UCS-2 (Unicode Character Set-2) data to MBCS data and vice versa as per the requirement.

AT 1007 uses Xerces that supports UTF-8 for providing internationalization. AT 1007 uses HTML templates and JSPs that are stored in a root directory. AT 1007 supports multiple languages by placing a different template for each language in a sub-directory. The name of the sub-directory is driven by the system locale.

3.8.7 Scaling Options

System 1000 is scalable and may be deployed as a large enterprise, a workgroup or a departmental solution. The present invention is scalable at both the system as well as the application level. At the system level, the three layers—Presentation Layer 1001, Service Layer 1003 and Data Layer 1005—may be deployed on a single server or may be spread over multiple servers. Every layer may further be deployed on one or more servers. If multiple servers are used, industry standard load balancing and fail-over solutions such as F5 and Cisco may be used. Engine 1017 may also be deployed on multiple servers. Load balancing and fail-over solutions from J2EE are used while deploying Engine 1017 on multiple servers. In the database server, high availability is achieved by using options such as Veritas Clustering and Oracle Parallel Server.

At the application level, various scaling solutions are available with System 1000. Throughput and responsiveness of System 1000 may be improved by increasing the number of concurrent process execution tasks. Engine 1017 adapts to available resources such as CPU and memory. In other words, Engine 1017 scales itself linearly with available resources. Thus, increasing resources on a single server or adding multiple servers improves the performance of System 1000.

Advantages offered by the present invention are as following:

The present invention allows creation of GUIs for software applications without coding, purely by modeling the UIs using meta-data.

The present invention allows development of GUIs for software applications with reduced software development life cycles.

The present invention allows changes to be made rapidly to GUIs by merely changing the GUI models without doing any re-coding or code-testing as in a conventional software development life cycle.

The present invention eliminates the need for an application designer to have expertise in at least one formal programming language for creating GUIs for software application.

The present invention may also be embodied in computer program product for use with a computer. The computer program product includes a computer readable medium having a computer readable program code embodied therein.

While the embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for enabling an application designer and a user to develop a User Interface (UI) from a plurality of UI models without coding, each of the plurality of UI models being developed using a plurality of pre-built reusable components, the method comprising the steps of:
   a. identifying the requirements of the UI as processes, the application designer identifying the processes;
   b. defining tasks that are required to define the identified processes, the tasks being defined by providing meta data to instances of a set of pre-built reusable components, the meta-data being provided using a visual modeling environment, each pre-built reusable component being an abstract object built to perform a function;
   c. enabling the application designer to verify the defined tasks by applying a set of pre-defined verifications on each of the defined tasks;
   d. connecting the defined tasks in a logical order using the visual modeling environment, the defined tasks being connected to model the identified processes, the identified processes being used to develop the plurality of UI models;
   e. storing the plurality of UI models in a database;
   f. executing the plurality of UI models by an engine based on a plurality of requests, the plurality of requests being made by the application designer and the user while developing the UI, the plurality of requests being concurrently executed by loading the identified processes from the database and executing the tasks specified in the identified processes, the tasks being executed in the logical order; and
   g. enabling the application designer to visually verify the developed UI, the verification comprising the steps of:
      i. observing values of a plurality of watch variables while executing the plurality of UI models, the plurality of watch variables being identified by the application designer;
      ii. stopping at each of a plurality of break points while executing the plurality of UI models, the plurality of break points being set by the application designer; and
      iii. analyzing information related to the plurality of UI models at each of the plurality of break points.

2. The method according to claim 1, wherein the step of defining the tasks comprises:
   a. defining the tasks that are required to define the processes that are required to develop UI screens comprising:
      i. defining the tasks for placing controls on the UI screens;
      ii. defining the tasks for mapping of database fields to screen variables;
      iii. defining the tasks for validating user actions at a control level and at a screen level;
      iv. defining the tasks for forwarding screen information to an application controller; and
   b. defining the tasks that are required to define the processes that are required to develop the structure of the UI.

3. The method according to claim 2, wherein the step of defining the tasks comprises the steps of:
   a. selecting the set of pre-built reusable components that are required to define the tasks; and
   b. defining the tasks, the tasks being defined by specifying meta-data for the selected pre-built reusable components, the meta-data being process specific properties which when associated with a pre-built reusable component defines the corresponding task.

4. The method according to claim 1, wherein the step of connecting the defined tasks in the logical order comprises the steps of:
   a. defining at least one Rule;
   b. specifying tasks to be referred to in case of success of the at least one Rule; and
   c. specifying tasks to be referred to in case of failure of the at least one Rule.

5. The method according to claim 1, wherein the step of executing the plurality of UI models comprises the steps of:
   a. inputting the plurality of requests to be processed, the plurality of requests being input by the application designer and the user while developing the UI;
   b. transferring the plurality of requests to the Engine for processing;
   c. identifying the pre-built reusable components required to process the plurality of requests;
   d. caching the identified pre-built reusable components;
   e. executing the tasks in the logical order as defined in the identified processes;
   f. handling errors that occur while processing the plurality of requests, if errors occur in any of the above steps;
   g. logging the information related to the execution of tasks in the database; and
   h. outputting the results of the execution.

6. A method for enabling an application designer and a user to develop a User Interface (UI) from a plurality of UI models without coding, each of the plurality of UI models being developed using a plurality of pre-built reusable components, the method comprising the steps of:
   a. identifying the requirements of the UI as processes, the application designer identifying the processes;
   b. defining tasks that are required to define the identified processes, the tasks being defined by providing meta-data to instances of a set of pre-built reusable components, the meta-data being provided using a visual modeling environment, each pre-built reusable component being an abstract object built to perform a function;
   c. verifying the defined tasks by applying a set of pre-defined verifications on each of the defined task;
   d. connecting the defined tasks in a logical order using the visual modeling environment, the defined tasks being connected to model the identified processes, the identified processes being used to develop the plurality of UI models;
   e. storing the plurality of UI models in a database;
   f. inputting a plurality of requests to be processed, the plurality of requests being input by the application designer and the user while developing the UI;
   g. transferring the plurality of requests to an Engine for processing;
   h. identifying the pre-built reusable components required to process the plurality of requests;
   i. caching the identified pre-built reusable components;
   j. executing the tasks in the logical order as defined in the identified processes;
   k. enabling the application designer to visually verify the developed UI, the verification comprising the steps of:
      i. observing values of a plurality of watch variables while executing the plurality of UI models, the plurality of watch variables being identified by the application designer;
      ii. stopping at each of a plurality of break points while executing the plurality of UI models, the plurality of break points being set by the application designer; and
      iii. analyzing information related to the plurality of UI models at each of the plurality of break points;
   l. handling errors that occur while processing the plurality of requests, if errors occur in any of the above steps;
   m. logging the information related to the execution of tasks in the database; and
   n. outputting the results of the execution.

7. A computer program product for use with a computer, the computer program product comprising a computer usable medium having a computer readable program code embodied therein for enabling an application designer and a user to develop a User Interface (UI) from a plurality of UI models without coding, each of the plurality of UI models being developed using a plurality of pre-built reusable components, the computer program code performing the steps of:
   a. identifying the requirements of the UI as processes, the application designer identifying the processes;
   b. defining tasks that are required to define the identified processes, the tasks being defined by providing meta-data to instances of a set of pre-built reusable components, the meta-data being provided using a visual modeling environment, each pre-built reusable component being an abstract object built to perform a function;
   c. enabling the application designer to verify the defined tasks by applying a set of pre-defined verifications on each of the defined tasks;
   d. connecting the defined tasks in a logical order using the visual modeling environment, the defined tasks being connected to model the identified processes, the identified processes being used to develop the plurality of UI models;
   e. storing the plurality of UI models in a database;
   f. executing the plurality of UI models by an engine based on a plurality of requests, the plurality of requests being made by the application designer and the user while developing the UI, the plurality of requests being concurrently executed by loading the identified processes from the database and executing the tasks specified in the identified processes, the tasks being executed in the logical order; and
   g. enabling the application designer to visually verify the developed UI, the verification comprising the steps of:
      i. observing values of a plurality of watch variables while executing the plurality of UI models, the plurality of watch variables being identified by the application designer;
      ii. stopping at each of a plurality of break points while executing the plurality of UI models, the plurality of break points being set by the application designer; and
      iii. analyzing information related to the plurality of UI models at each of the plurality of break points.

8. The computer program product as claimed in claim 7, the computer program product further comprising program code embodied therein for enabling the application designer and the user to execute the plurality of UI models using the com puter program product, the computer program code performing the steps of:
  a. inputting the plurality of requests to be processed, the plurality of requests being input by the application designer and the user while developing the UI;
  b. transferring the plurality of requests to the Engine for processing;
  c. identifying the pre-built reusable components required to process the plurality of requests;
  d. caching the identified pre-built reusable components;
  e. executing the tasks in the logical order as defined in the identified processes;
  f. handling errors that occur while processing the plurality of requests, if errors occur in any of the above steps;
  g. logging the information related to the execution of the tasks in the database; and
  h. outputting the results of the execution.

* * * * *